US012699797B2

(12) United States Patent
Carru et al.

(10) Patent No.: US 12,699,797 B2
(45) Date of Patent: Aug. 4, 2026

(54) CATALOG SERVICE CONFIGURATION BASED ON A PRIVILEGE MODEL AND TWO-WAY SYNCHRONIZATION

(71) Applicant: Snowflake Inc., Bozeman, MT (US)

(72) Inventors: Damien Carru, New York, NY (US); Xianyin Chen, Seattle, WA (US); Michael Collado, Seattle, WA (US); Benoit Dageville, San Mateo, CA (US); Dennis Huo, Newcastle, WA (US); Tyler Jones, Redwood City, CA (US); Dennis Edgar Lynch, San Carlos, CA (US); James Malone, Seattle, WA (US); Subramanian Muralidhar, Mercer Island, WA (US); Maninderjit Singh Parmar, Kirkland, WA (US); Saurin Shah, Kirkland, WA (US)

(73) Assignee: Snowflake Inc., Bozeman, MT (US)

( * ) Notice: Subject to any disclaimer, the term of this patent is extended or adjusted under 35 U.S.C. 154(b) by 128 days.

(21) Appl. No.: 18/893,231

(22) Filed: Sep. 23, 2024

(65) Prior Publication Data

US 2026/0087160 A1    Mar. 26, 2026

(51) Int. Cl.
*G06F 21/62* (2013.01)
(52) U.S. Cl.
CPC ................................ *G06F 21/6218* (2013.01)
(58) Field of Classification Search
None
See application file for complete search history.

(56) References Cited

U.S. PATENT DOCUMENTS 6,076,091 A * 6/2000 Fohn ..................... G06F 16/954
                                                    707/948
11,615,062 B1 3/2023 Waas et al.
2013/0111583 A1* 5/2013 Hernandez .......... G06F 21/6218
                                                    726/21

(Continued)

OTHER PUBLICATIONS

Apache Iceberg, "Spec Table Metadata Fields", [Online]. Retrieved from the Internet: https: iceberg.apache.org spec #table-metadata-fields, (Accessed online Jan. 23, 2025), 131 pages.

(Continued)

*Primary Examiner* — Paul R Fisher
(74) *Attorney, Agent, or Firm* — Schwegman Lundberg & Woessner, P.A.

(57) ABSTRACT

Provided herein are systems, methods, and computer-storage media for managing data object access in a catalog service account. The method includes detecting, at a catalog service account, by a catalog manager (CM), a user request to access a data object. The user request includes identification information of the user and a principal role associated with the user. The CM retrieves one or more catalog roles from a first catalog of the catalog service account. The one or more catalog roles correspond to the principal role. The CM determines a set of hierarchical data objects based on the user request. The set of hierarchical data objects comprise the data object. The CM performs a determination of whether access privileges of the set of hierarchical data objects and access privileges of the one or more catalog roles allow access to the data object. The CM grants access to the data object based on the determination.

30 Claims, 22 Drawing Sheets

(56)                   References Cited

U.S. PATENT DOCUMENTS

| | | | |
|---|---|---|---|
| 2018/0004793 A1 | 1/2018 | Desai et al. | |
| 2018/0150362 A1 | 5/2018 | Lee et al. | |
| 2019/0045007 A1 | 2/2019 | Wyatt et al. | |
| 2020/0089789 A1 | 3/2020 | Mace et al. | |
| 2020/0311294 A1* | 10/2020 | Sim-Tang | G06F 16/1774 |
| 2024/0394293 A1 | 11/2024 | Lauber | |
| 2025/0245206 A1 | 7/2025 | Fanghaenel et al. | |

OTHER PUBLICATIONS

Apache Iceberg, "Configuration Catalog Properties", [Online]. Retrieved from the Internet: https: iceberg.apache.org docs 1.5.0 configuration #catalog-properties, (Accessed online Apr. 30, 2025), 16 pages.

Apache Polaris, "Access Control", [Online]. Retrieved from the Internet: https: polaris.apache.org in-dev unreleased access-control, (Accessed online Apr. 23, 2025), 7 pages.

Github, "Rest Catalog Open-Api.yaml", [Online]. Retrieved from the Internet: https: github.com apache iceberg blob 2886ef4bf6cf575f9780a5bfd351a4f4d51cce4b open-api rest-catalog-open-api.yaml#L959C3-L959C36, (Accessed online Apr. 30, 2025), 84 pages.

Github, "Rest Catalog Open api.yaml (ed2d041)", [Online]. Retrieved from the Internet: https: github.com apache iceberg blob ed2d0410c861c6fcec825dff738d01559f2cd590 open-api rest-catalog-open-api.yaml#L2557C1-L2575C62, (Accessed online Apr. 30, 2025), 84 pages.

Github, "GlueTableOperations.java", [Online]. Retrieved from the Internet: https: github.com apache iceberg blob e10098b9ab7cb532d2ca4876f00997102446e52d aws src main java org apache iceberg aws glue GlueTableOperations.java#L159, (Accessed online Apr. 30, 2025), 9 pages.

Github, "Rest Catalog Open api.yaml (ed0959257)", [Online]. Retrieved from the Internet: https: github.com apache iceberg blob ed0959257cba02f378f7097d81cecaaaef9fa43f open-api rest-catalog-open-api.yaml#L132, (Accessed online Apr. 30, 2025), 84 pages.

IBM, "Handle SQL identifiers", [Online]. Retrieved from the Internet: https: www.ibm.com docs en netezza?topic=md- handle-sql-identifiers, (Accessed online Apr. 23, 2025), 2 pages.

Iceberg Apache, "Interface Supports Name spaces", [Online]. Retrieved from the Internet: https: iceberg.apache. org javadoc latest org apache iceberg catalog SupportsNamespaces.html#setProperties(org. apache.iceberg.catalog. Namespace), (Accessed online Apr. 30, 2025), 5 pages.

Kaul, Jan, "Rest-Catalog: Define Route to update MetadataLocation of a Table #7261", apache iceberg, [Online]. Retrieved from the Internet: https: github.com apache iceberg issues 7261, (Apr. 1, 2023), 3 pages.

SPEC—Apache Iceberg, "Table Metadata Fields", [Online]. Retrieved from the Internet: https: iceberg.apache.org spec #table-metadata-fields, (Accessed online Apr. 30, 2025), 132 pages.

Stack Overflow, "S3: How to grant access to multiple buckets?", [Online]. Retrieved from the Internet: https: stackoverflow.com questions 33744753 s3-how-to-grant-access-to-multiple-buckets, (Accessed online Apr. 30, 2025), 2 pages.

* cited by examiner

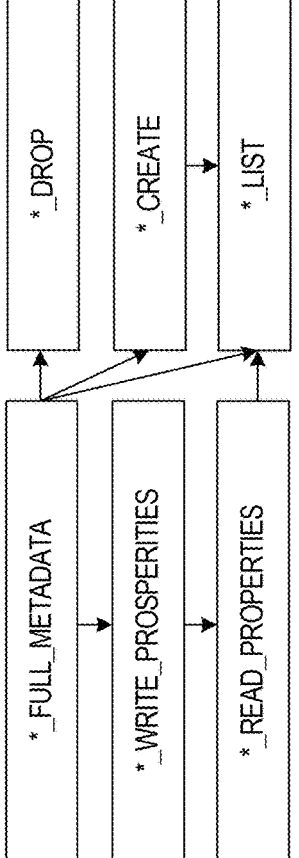
FIG. 10

2100

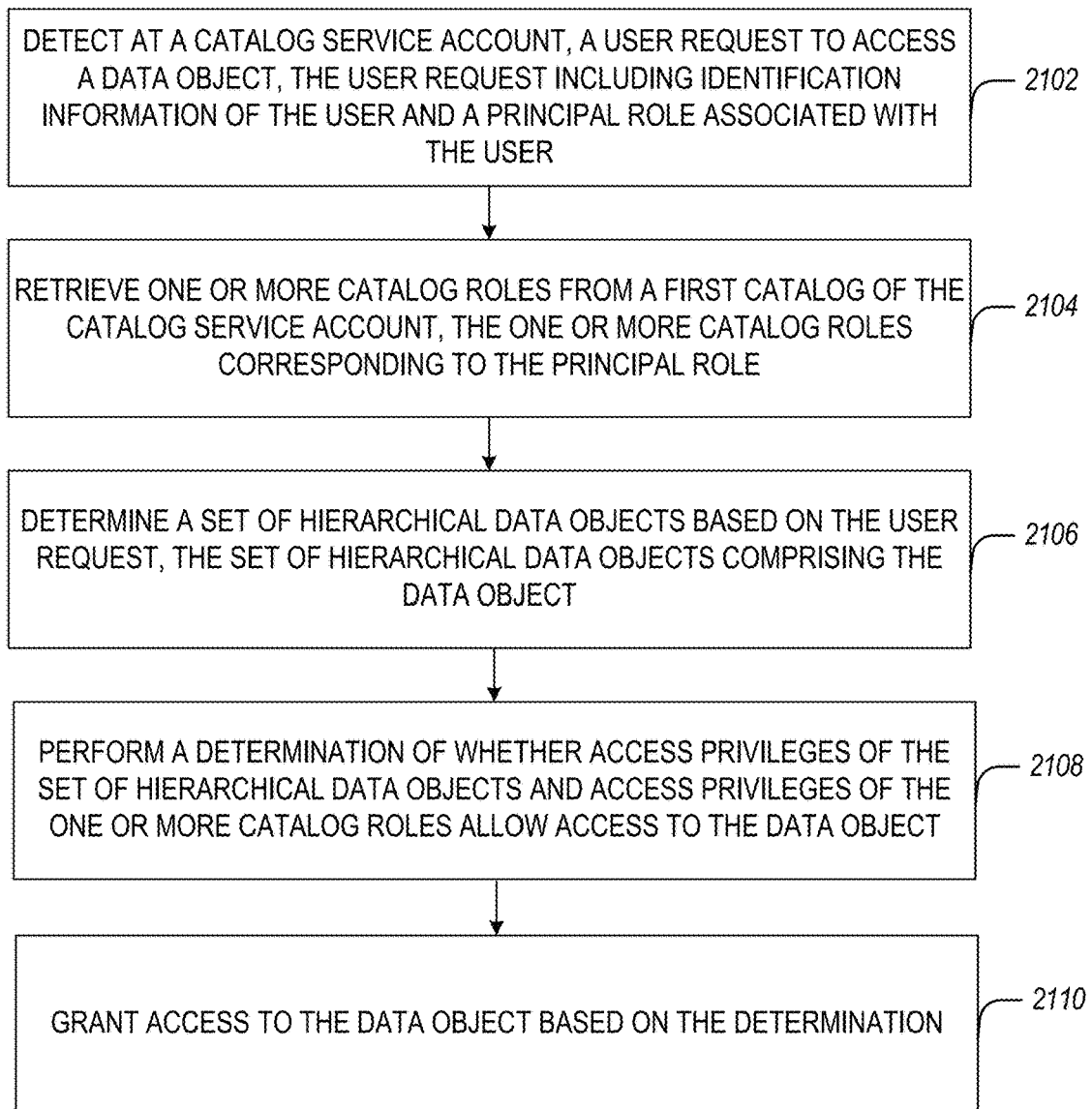

DETECT AT A CATALOG SERVICE ACCOUNT, A USER REQUEST TO ACCESS A DATA OBJECT, THE USER REQUEST INCLUDING IDENTIFICATION INFORMATION OF THE USER AND A PRINCIPAL ROLE ASSOCIATED WITH THE USER — 2102

RETRIEVE ONE OR MORE CATALOG ROLES FROM A FIRST CATALOG OF THE CATALOG SERVICE ACCOUNT, THE ONE OR MORE CATALOG ROLES CORRESPONDING TO THE PRINCIPAL ROLE — 2104

DETERMINE A SET OF HIERARCHICAL DATA OBJECTS BASED ON THE USER REQUEST, THE SET OF HIERARCHICAL DATA OBJECTS COMPRISING THE DATA OBJECT — 2106

PERFORM A DETERMINATION OF WHETHER ACCESS PRIVILEGES OF THE SET OF HIERARCHICAL DATA OBJECTS AND ACCESS PRIVILEGES OF THE ONE OR MORE CATALOG ROLES ALLOW ACCESS TO THE DATA OBJECT — 2108

GRANT ACCESS TO THE DATA OBJECT BASED ON THE DETERMINATION — 2110

*FIG. 21*

CATALOG SERVICE CONFIGURATION BASED ON A PRIVILEGE MODEL AND TWO-WAY SYNCHRONIZATION

TECHNICAL FIELD

Embodiments of the disclosure generally relate to databases and, more specifically, to configuring a catalog service based on a privilege model and two-way synchronization.

BACKGROUND

Databases are widely used for data storage and access in computing applications. A goal of database storage is to provide enormous sums of information in an organized manner so that it can be accessed, managed, updated, and shared. Data may be organized into rows, columns, and tables in a database. Different database storage systems may be used to store different types of content, such as bibliographic, full text, numeric, and image content. Further, in computing, different database systems may be classified according to the organizational approach of the database. There are many different types of databases, including relational, distributed, cloud, object-oriented, and others.

Databases may include one or more tables that include or reference data that can be joined, read, modified, or deleted using queries. Databases can store small or large sets of data within one or more tables. This data can be accessed by various users in an organization or even be used to service public users, such as via a website or an application programming interface (API). Both computing and storage resources and their underlying architecture can play a significant role in achieving desirable database performance, including facilitating access to different types of data. However, data processing, including the processing of files and tables, can be associated with inefficient workload distribution, high latency, and inefficient allocation of compute resources. Additionally, the configuration of table access and synchronization of multiple tables can be challenging and time-consuming.

BRIEF DESCRIPTION OF THE DRAWINGS

The present disclosure will be understood more fully from the detailed description given below and from the accompanying drawings of various embodiments of the disclosure.

FIG. 10 illustrates a diagram with an example privilege structure used in connection with the privileges of FIG. 9, in accordance with some embodiments of the present disclosure.

FIG. 21 is a flow diagram illustrating the operations of a database system in performing a method for configuring a catalog service, in accordance with some embodiments of the present disclosure.

DETAILED DESCRIPTION

Figure 1:
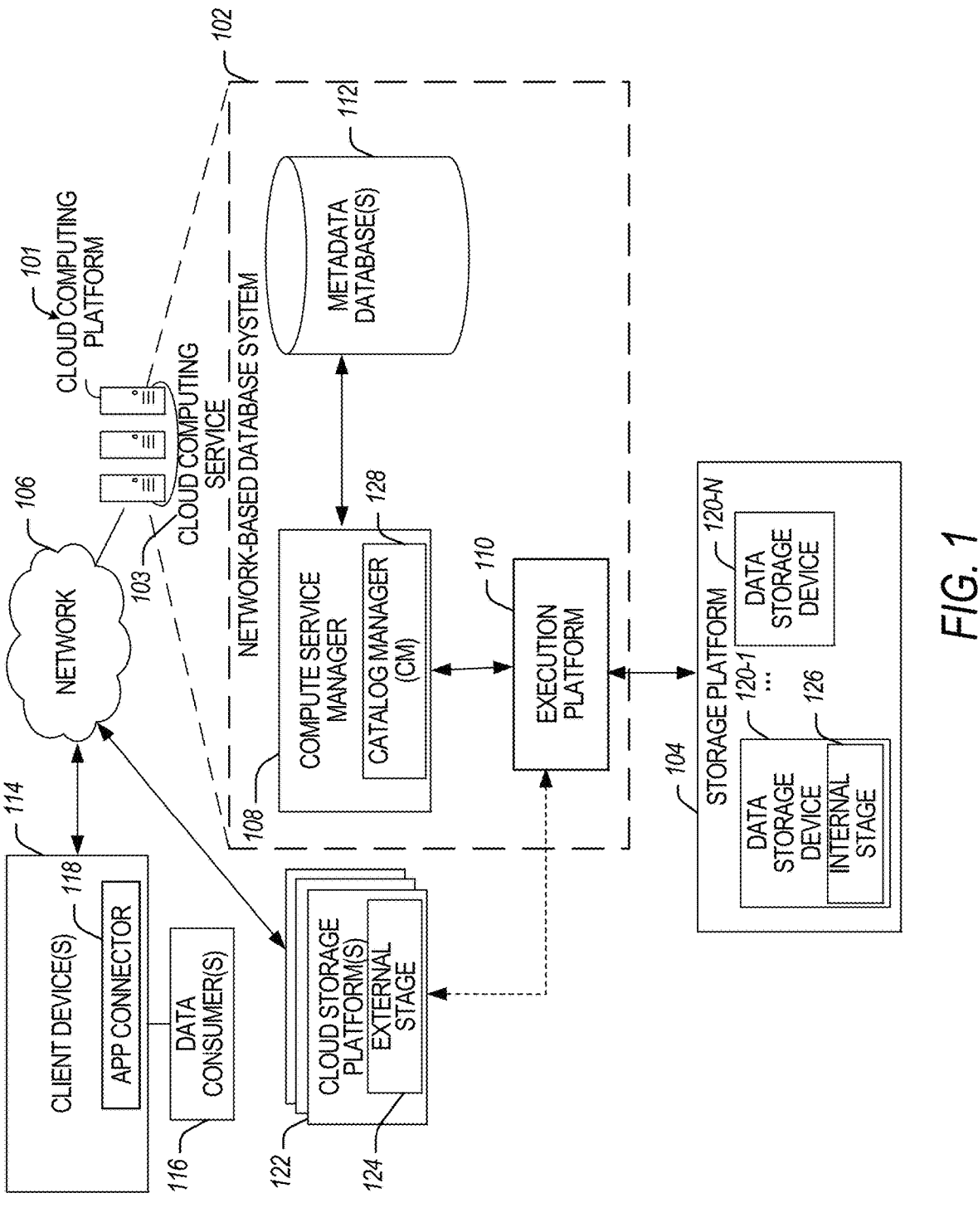
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internally in the data platform, a given file is referred to herein as an "internal file" and may be stored in (or at, or on, etc.) what is referred to herein as an "internal storage location." If stored externally to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, extensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured file types, semi-structured file types, and structured file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "table" indicates mutable rows supporting time travel up to a retention period.

Apache Iceberg is an open-source software (OSS) "table format" that allows data engineers to manage table-like datasets stored in Parquet files on blob storage. Aspects of the present disclosure provide techniques for configuring database object types (e.g., a dynamic table), including configuring managed dynamic Iceberg tables.

Apache Iceberg provides an open-table format where any engine can operate on the data in an Iceberg table in a transactionally consistent way, without contacting a database or copying data from a database. An Iceberg table can include three components: the data (e.g., stored in parquet format or another format), metadata (which represents what part of the data is in a certain snapshot), and a catalog.

As used herein, the term "catalog" indicates a data management structure that can be configured as a single pane used to determine which are the latest snapshots that can be queried, what data is committed or can be committed, or discover data assets that are available via a table m (e.g., an Iceberg table). Tasks such as creating, dropping, and renaming tables are the functionalities associated with a catalog. In this regard, the catalog provides a single pane to manage a collection of tables grouped into one or more namespaces, including discovering available tables, discovering and managing their metadata, and being the authority on tracking and committing table snapshots (or versions). In some aspects, multiple types of compute or data processing engines (e.g., different network-based database systems) can use the disclosed techniques to access a shared catalog (e.g., a shared Iceberg catalog associated with one or more Iceberg tables), allowing the sharing of a common data layer.

In some aspects, a catalog can be configured using two components:

(a) A catalog interface. Database vendors can implement the catalog interface via a software development kit (SDK) or a Rest application programming interface (API). The Rest API can be used to configure the ability to manage the tables and namespace. However, a drawback of the available Rest APIs is that they do not provide any ability to securely manage the tables and namespace (e.g., currently there is no notion of configuring specific user access or restricting the access control to the tables).

(b) A catalog integration. A third-party vendor implementation of a catalog can be consumed by a network-based database system (NBDS) via the catalog integration.

The Apache Iceberg catalog specification does not include standardizations for security models that govern users, roles, permissions, and grants. Some catalog vendors have their own proprietary governance solution on top of the Iceberg metadata. These security models are proprietary, and customers wanting to move from one catalog vendor to another have no frictionless way of reusing or porting the existing security model, creating a vendor lock-in.

Tables, views, and objects can be secured from a catalog metadata perspective. However, the underlying storage of the physical data can be secured separately, which can cause security inconsistencies. Customers have to manage both the catalog and the storage and maintain a consistent state between both. Existing credential-generating techniques are unable to work across cloud storages and cause customer lock-in on a proprietary catalog solution.

The disclosed techniques can be used (e.g., by a catalog manager) to configure a catalog service that provides a catalog with the ability to designate users and configure (e.g., restrict) their access to one or more tables associated with the catalog (e.g., by using a privilege model). The disclosed techniques can also be used to synchronize (or sync) an NBDS-based catalog to another catalog managed by a catalog service (e.g., a catalog service that is external to the NBDS). The sync functionality can be achieved by, e.g., performing "push and publish" of the NBDS-based catalog data.

In some aspects, the disclosed catalog service provides a full user, role, and permission model to manage access to tables and objects within a catalog (e.g., an Iceberg catalog). Access to the permission model can be made available through a management Rest API.

In some aspects, the disclosed catalog service provides a scoped storage credential for engine access to underlying storage.

In some aspects, the disclosed catalog service provides a management REST API to create and manage catalogs as well as create and manage users, roles, and permission grants.

In some aspects, a catalog manager can be used to configure an integration of the disclosed catalog service with a network-based database system (NBDS). When enabled for synchronization, the NBDS can push NBDS-managed Iceberg tables (or a catalog) to the catalog service for external engines to read (e.g., read-only access). The read-only table (or catalog) at the catalog service can be referred to as an external table (or external catalog). When enabled, the synchronization can be bi-directional, and Iceberg tables created by external engines in the catalog service can be reflected in the NBDS as unmanaged Iceberg tables that can be queried from the NBDS. In some aspects, the external catalog at the catalog service cannot be written to via Iceberg application programming interfaces (APIs) (e.g., updateTable, createTable, registerTable, and commitUpdates).

The disclosed catalog manager and catalog service are associated with the following advantages over existing catalog-related solutions. The disclosed catalog service provides an open-source implementation so that NBDS customers can own their full metadata and have the flexibility to choose how they host their catalog on any platform or any cloud. The disclosed catalog service secures the objects in the catalog from the metadata layer and the storage layer by generating temporary storage access credentials, which compute engines can use to access the storage layer. This provides a consistent state of access between the two layers and simplifies administration.

Although embodiments described herein mention Iceberg tables, it is appreciated that the subject system is enabled to support any appropriate external table format (e.g., Apache Hive ACID, Apache Hudi, and the like). Moreover, the subject system is enabled to support any appropriate file format in addition to the aforementioned Apache Parquet file format (e.g., CSV, XML, ORC, Avro, JSON, and the like).

The various embodiments that are described herein are described with reference, where appropriate, to one or more of the various figures. An example computing environment using a DT manager to configure DTs is discussed in connection with FIGS. 1-3. Example catalog service configuration and functions are discussed in connection with FIGS. 4-21. A more detailed discussion of example computing devices that may be used in connection with the disclosed techniques is provided in connection with FIG. 22.

In some examples, a system comprising: at least one hardware processor; and at least one memory storing instructions that cause the at least one hardware processor to perform operations comprising: detecting, at a catalog service account, a user request to access a data object, the user request including identification information of the user and a principal role associated with the user; retrieving one or more catalog roles from a first catalog of the catalog service account, the one or more catalog roles corresponding to the principal role; determining a set of hierarchical data objects based on the user request, the set of hierarchical data objects comprising the data object; performing a determination of whether access privileges of the set of hierarchical data objects and access privileges of the one or more catalog roles allow access to the data object; and granting access to the data object based on the determination.

In some examples, the operations further comprise retrieving the access privileges of the set of hierarchical data objects and the access privileges of the one or more catalog roles from a role-based security model of the catalog service account.

In some examples, the operations further comprise detecting the set of hierarchical data objects comprises a plurality of nested namespaces; and determining the access privileges of the set of hierarchical data objects based on access privileges for each namespace of the plurality of nested namespaces.

In some examples, the operations further comprise retrieving a first set of access privileges from the role-based security model, the first set of access privileges associated with the first catalog, and including the access privileges of the one or more catalog roles; retrieving a second set of access privileges from the role-based security model, the second set of access privileges associated with a second catalog of the catalog service account; and configuring access to the first catalog and the second catalog based on the first set of access privileges and the second set of access privileges.

In some examples, the operations further comprise retrieving a plurality of principal identities associated with the catalog service account; and selecting a principal identity of the plurality of principal identities based on the identification information of the user.

In some examples, the operations further comprise retrieving a plurality of catalog roles configured in the first catalog; and selecting the one or more catalog roles from the plurality of catalog roles based on the principal role.

In some examples, the operations further comprise determining the set of hierarchical data objects based on the one or more catalog roles, the set of hierarchical data objects comprising at least one namespace, at least one table, and at least one table view.

In some examples, the operations further comprise detecting a synchronization request received at the catalog service account, the synchronization request associated with a second catalog that is external to the catalog service account.

In some examples, the operations further comprise generating responsive to the synchronization request, an external catalog representation of the second catalog, the external catalog representation configured as a read-only catalog in the catalog service account.

In some examples, the operations further comprise receiving via an application programming interface (API), a notification of an update posted to the second catalog; and updating the external catalog representation based on the update.

In some examples, a method comprises detecting, at a catalog service account, by at least one hardware processor, a user request to access a data object, the user request including identification information of the user and a principal role associated with the user; retrieving one or more catalog roles from a first catalog of the catalog service account, the one or more catalog roles corresponding to the principal role; determining a set of hierarchical data objects based on the user request, the set of hierarchical data objects comprising the data object; performing a determination of whether access privileges of the set of hierarchical data objects and access privileges of the one or more catalog roles allow access to the data object; and granting access to the data object based on the determination.

In some examples, the method further comprises retrieving the access privileges of the set of hierarchical data objects and the access privileges of the one or more catalog roles from a role-based security model of the catalog service account.

In some examples, the method further comprises detecting the set of hierarchical data objects comprises a plurality of nested namespaces; and determining the access privileges of the set of hierarchical data objects based on access privileges for each namespace of the plurality of nested namespaces.

In some examples, the method further comprises retrieving a first set of access privileges from the role-based security model, the first set of access privileges associated with the first catalog, and including the access privileges of the one or more catalog roles; retrieving a second set of access privileges from the role-based security model, the second set of access privileges associated with a second catalog of the catalog service account; and configuring access to the first catalog and the second catalog based on the first set of access privileges and the second set of access privileges.

In some examples, the method further comprises retrieving a plurality of principal identities associated with the catalog service account; and selecting a principal identity of the plurality of principal identities based on the identification information of the user.

In some examples, the method comprises retrieving a plurality of catalog roles configured in the first catalog; and selecting the one or more catalog roles from the plurality of catalog roles based on the principal role.

In some examples, the method comprises determining the set of hierarchical data objects based on the one or more catalog roles, the set of hierarchical data objects comprising at least one namespace, at least one table, and at least one table view.

In some examples, the method comprises detecting a synchronization request received at the catalog service account, the synchronization request associated with a second catalog that is external to the catalog service account.

In some examples, the method comprises generating responsive to the synchronization request, an external catalog representation of the second catalog, the external catalog representation configured as a read-only catalog in the catalog service account.

In some examples, the method comprises receiving via an application programming interface (API), a notification of an update posted to the second catalog; and updating the external catalog representation based on the update.

In some examples, a computer-storage medium comprising instructions that, when executed by one or more processors of a machine, configure the machine to perform operations comprising: detecting at a catalog service account, a user request to access a data object, the user request including identification information of the user and a principal role associated with the user; retrieving one or more catalog roles from a first catalog of the catalog service account, the one or more catalog roles corresponding to the principal role; determining a set of hierarchical data objects based on the user request, the set of hierarchical data objects comprising the data object; performing a determination of whether access privileges of the set of hierarchical data objects and access privileges of the one or more catalog roles allow access to the data object; and granting access to the data object based on the determination.

In some examples, the operations further comprise retrieving the access privileges of the set of hierarchical data objects and the access privileges of the one or more catalog roles from a role-based security model of the catalog service account.

In some examples, the operations further comprise detecting the set of hierarchical data objects comprises a plurality of nested namespaces; and determining the access privileges of the set of hierarchical data objects based on access privileges for each namespace of the plurality of nested namespaces.

In some examples, the operations further comprise retrieving a first set of access privileges from the role-based security model, the first set of access privileges associated with the first catalog, and including the access privileges of the one or more catalog roles; retrieving a second set of access privileges from the role-based security model, the second set of access privileges associated with a second catalog of the catalog service account; and configuring access to the first catalog and the second catalog based on the first set of access privileges and the second set of access privileges.

In some examples, the operations further comprise retrieving a plurality of principal identities associated with the catalog service account; and selecting a principal identity of the plurality of principal identities based on the identification information of the user.

In some examples, the operations further comprise retrieving a plurality of catalog roles configured in the first catalog; and selecting the one or more catalog roles from the plurality of catalog roles based on the principal role.

In some examples, the operations further comprise determining the set of hierarchical data objects based on the one or more catalog roles, the set of hierarchical data objects comprising at least one namespace, at least one table, and at least one table view.

In some examples, the operations further comprise detecting a synchronization request received at the catalog service account, the synchronization request associated with a second catalog that is external to the catalog service account.

In some examples, the operations further comprise generating responsive to the synchronization request, an external catalog representation of the second catalog, the external catalog representation configured as a read-only catalog in the catalog service account.

In some examples, the operations further comprise receiving via an application programming interface (API), a notification of an update posted to the second catalog; and updating the external catalog representation based on the update.

FIG. 1 illustrates an example computing environment 100 that includes a database system in the example form of a network-based database system 102 (also referred to as NBDS or NBDS 102), in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not explicitly described herein. In other embodiments, the computing environment may comprise another type of NBDS or a cloud data platform. For example, in some aspects, the computing environment 100 may include a cloud computing platform 101 with the NBDS 102, storage platforms 104, and cloud storage platforms 122. The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the DT-related functions described herein). The cloud computing platform 101 may include a three-tier architecture: data storage (e.g., storage platforms 104 and 122), an execution platform 110, and a compute service manager 108 providing cloud services (e.g., configuring catalog services using a catalog manager 128 (also referred to as CM 128)).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform, which is referred to herein as an internal storage location concerning the data platform.

From the perspective of the NBDS 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the NBDS 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 116 via network 106. The NBDS 102 is a network-based system used for reporting and analysis of integrated data from one or more disparate sources, including one or more storage locations within the cloud storage platform 104. The storage platform 104 comprises a plurality of computing machines and provides on-demand computer system resources such as data storage and computing power to the NBDS 102.

The NBDS 102 comprises a compute service manager 108, an execution platform 110, and one or more metadata databases 112. The NBDS 102 hosts and provides data reporting and analysis services (as well as additional services such as the disclosed functions associated with the automatic evolution of DTs) to multiple client accounts, including an account of the data provider associated with client device 114 and an account of the data consumer 116. In some embodiments, the compute service manager 108 comprises the CM 128, which can be used in connection with the disclosed catalog-related functions, including the configuration of a catalog service. to perform the disclosed techniques. A more detailed description of the functions provided by the CM 128 is provided in connection with FIGS. 4-21.

The compute service manager 108 coordinates and manages operations of the NBDS 102. The compute service manager 108 also performs query optimization and compilation and manages clusters of computing services that provide compute resources (also referred to as "virtual warehouses"). The compute service manager 108 can support any number of client accounts, such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the NBDS 102. The data provider may utilize application connector 118 at the client device 114 to submit data storage, retrieval, and analysis requests to the compute service manager 108 as well as to access or configure other services provided by the compute service manager 108.

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., the disclosed catalog service-related functions) offered by the NBDS 102 via network 106.

The compute service manager 108 is also coupled to one or more metadata databases 112 that store metadata about various functions and aspects associated with the NBDS 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and at least one cloud storage platform 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on the at least one cloud storage platform 122.

In some embodiments, communication links between elements of the computing environment 100 are implemented via one or more data communication networks, such as network 106. The one or more data communication networks may utilize any communication protocol and any communication medium. In some embodiments, the data communication networks are a combination of two or more data communication networks (or sub-networks) coupled with one another. In alternate embodiments, these communication links are implemented using any communication medium and any communication protocol.

The compute service manager 108, metadata database 112, execution platform 110, and storage platform 104 are shown in FIG. 1 as individual discrete components. However, each of the compute service manager 108, metadata database 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the NBDS 102. Thus, in the described embodiments, the NBDS 102 is dynamic and supports regular changes to meet the current data processing needs.

During typical operations, the NBDS 102 processes multiple jobs as determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from and store data to any of the data storage resources in the cloud storage platform 104.

Figure 2:
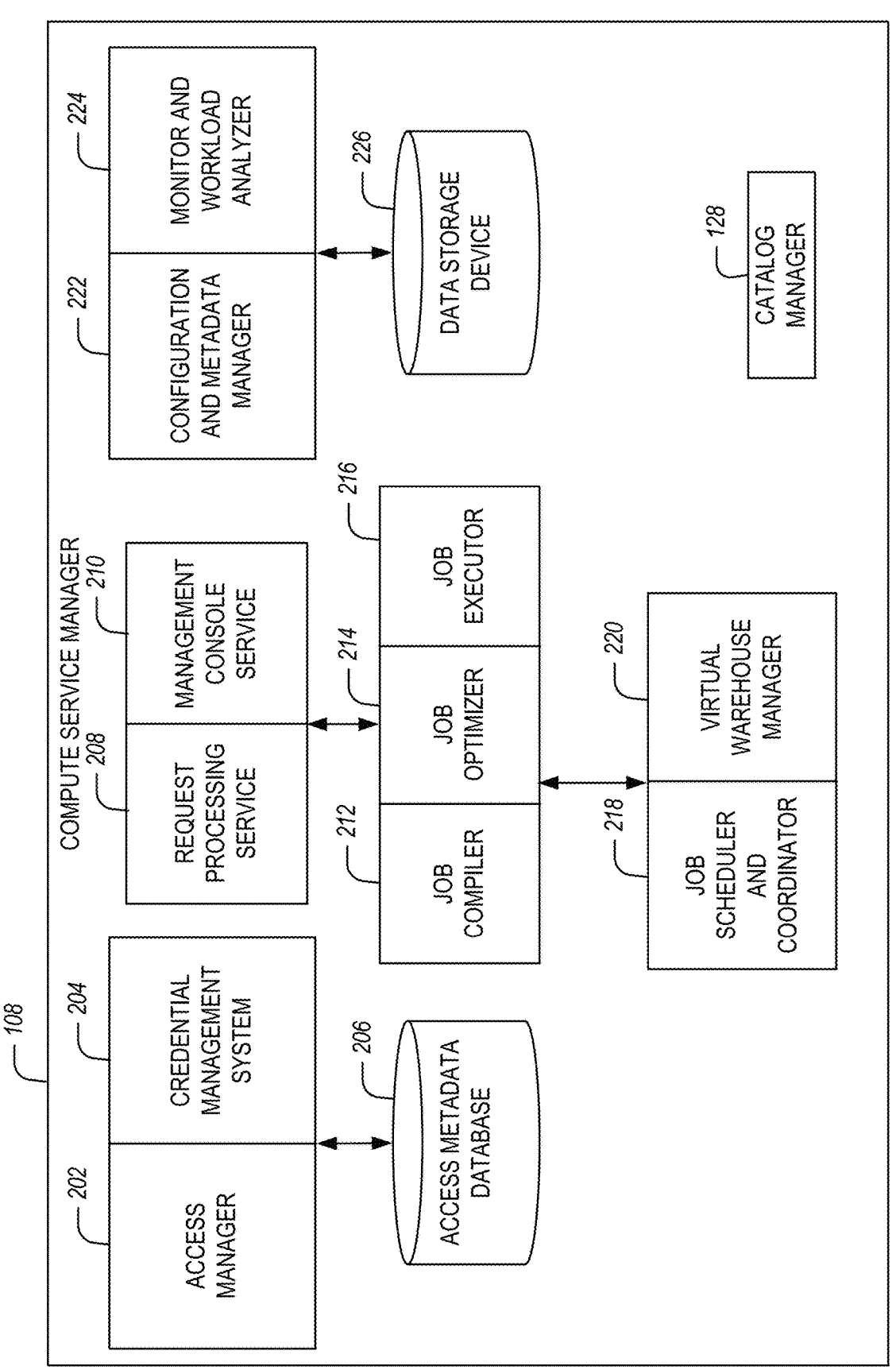
FIG. 2 is a block diagram illustrating the components of a compute service manager using a DT manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources, such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports administrators and other system managers' access to various systems and processes. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the NBDS 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the NBDS 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2) and should be disallowed from communicating with a third execution node (e.g., execution node 312-1) and any such illicit communication can be recorded (e.g., in a log or other location). Also, the information stored on a given execution node is restricted to data relevant to the current query, and any other data is unusable, rendered so by destruction or encryption where the key is unavailable.

In some embodiments, the compute service manager 108 further includes the CM 128, which can be used in connection with catalog service-related functions disclosed herein, such as configuring a catalog service to perform the disclosed functions.

Figure 3:
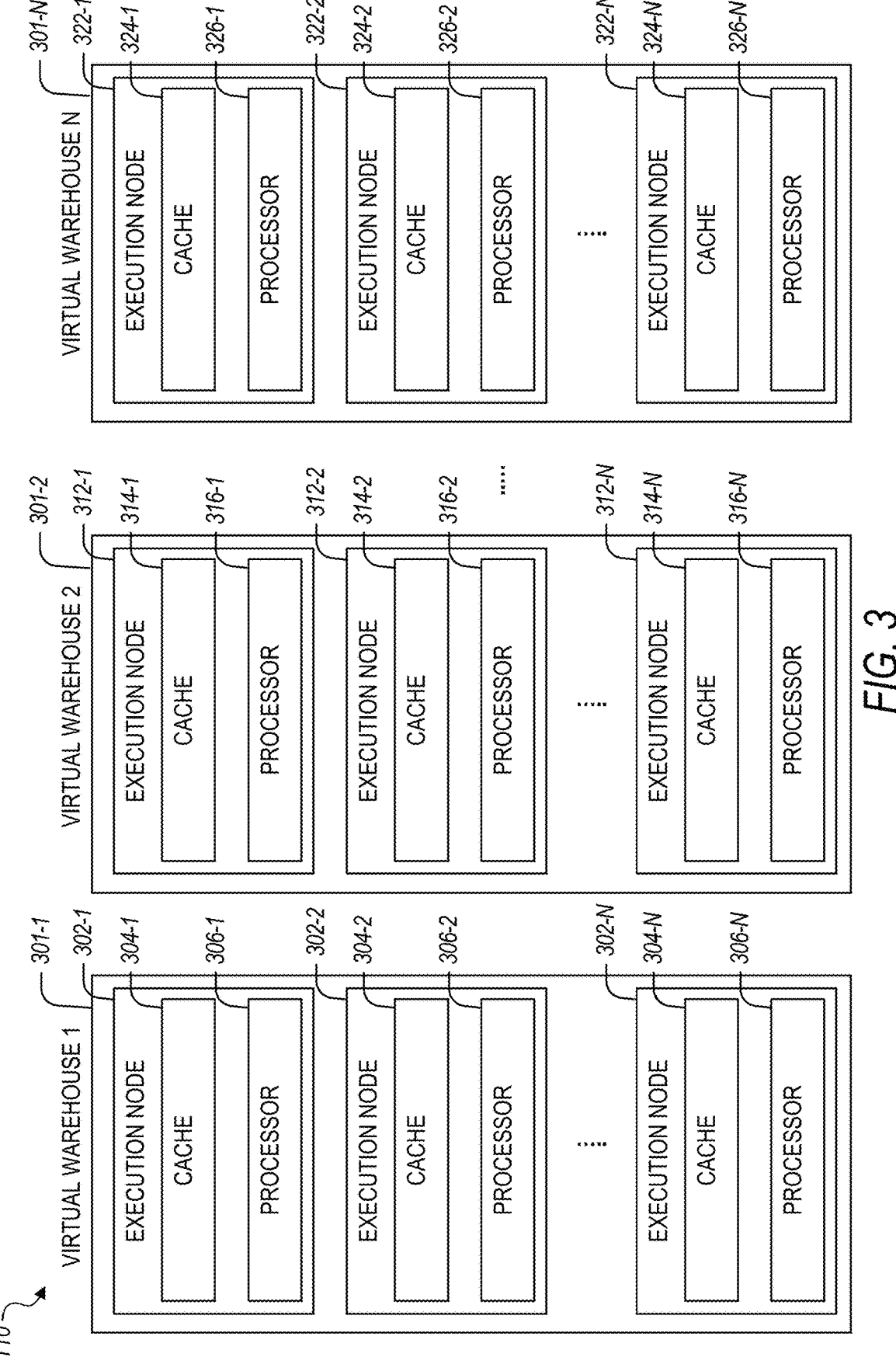
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic. New execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device. Still, the virtual warehouse or execution node may later access data from any other data storage device.

In the example of FIG. 3, virtual warehouse 1 includes three execution nodes: 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes: 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes: 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor; alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes. This is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, which is helpful for tasks that require fast scanning of large amounts of data. In some embodiments, the cache resources and computing resources associated with a particular execution node are determined when the execution node is created based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while another computing system implements virtual warehouses 2 and n at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, it is replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104. Still, each virtual warehouse has its execution nodes with independent processing and caching resources. This configuration allows requests on different virtual warehouses to be processed independently and with no interference between the requests. This independent processing, combined with the ability to add and remove virtual warehouses dynamically, supports the addition of new processing capacity for new users without impacting the performance observed by the existing users.

Figure 4:
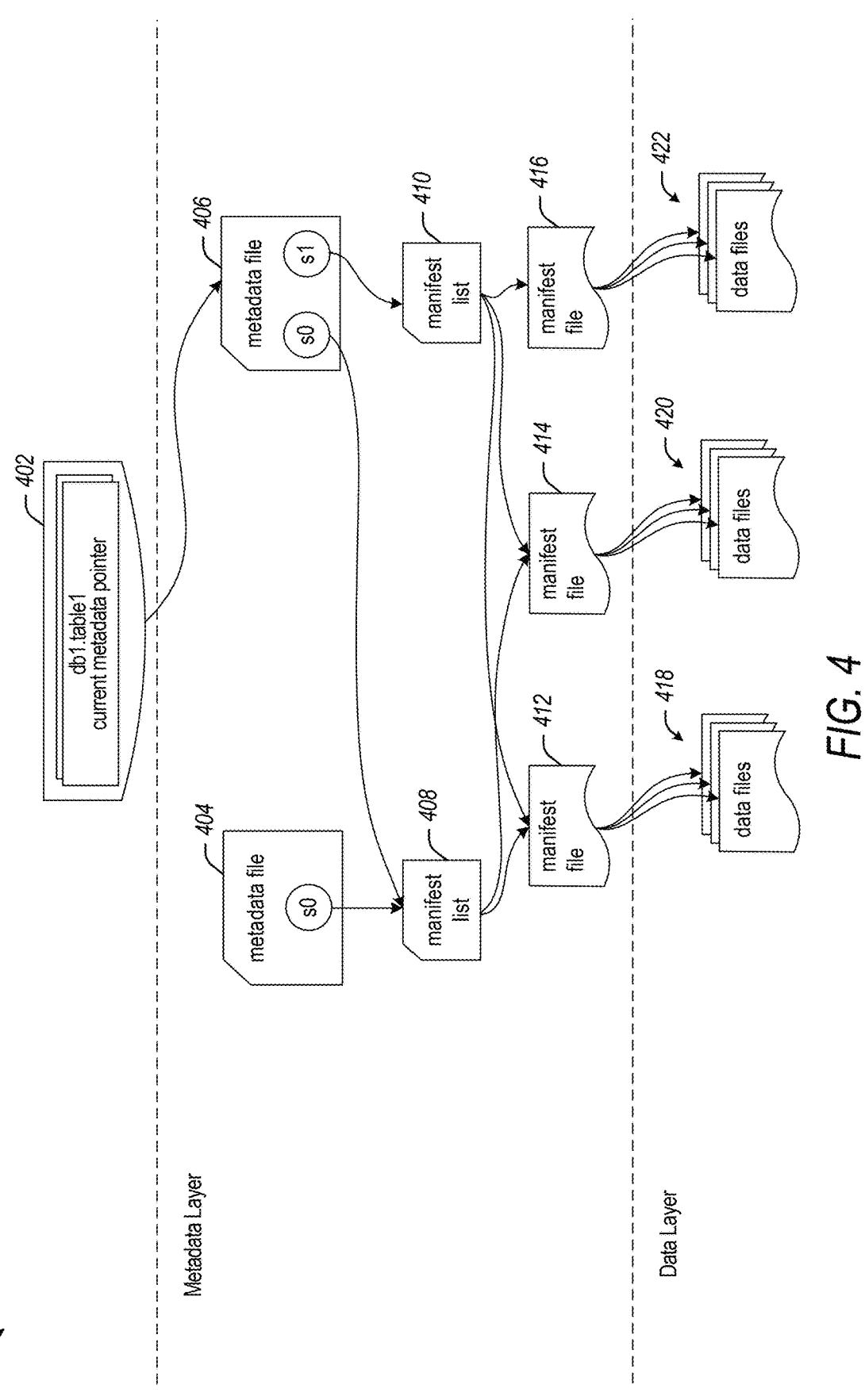
FIG. 4 is a block diagram illustrating files defining an Iceberg table, in accordance with some embodiments of the present disclosure.

FIG. 4 is a block diagram 400 illustrating files defining an Iceberg table, which can be used in connection with the present disclosure. Referring to FIG. 4, data files 418, 420, and 422 (of the data layer) may be in any format, including Parquet format. The metadata layer for the Iceberg specification includes metadata files 404 and 406 that list different snapshots (e.g., s0 and s1, as illustrated in FIG. 4) of the table. Each snapshot can point to a corresponding manifest list (e.g., manifest lists 408 and 410) containing the relevant manifest files (e.g., manifest files 412, 414, and 416). Each of the manifest files points to the final data files. The current metadata pointer 402 for a table can be implemented differently for each system.

Figure 5:
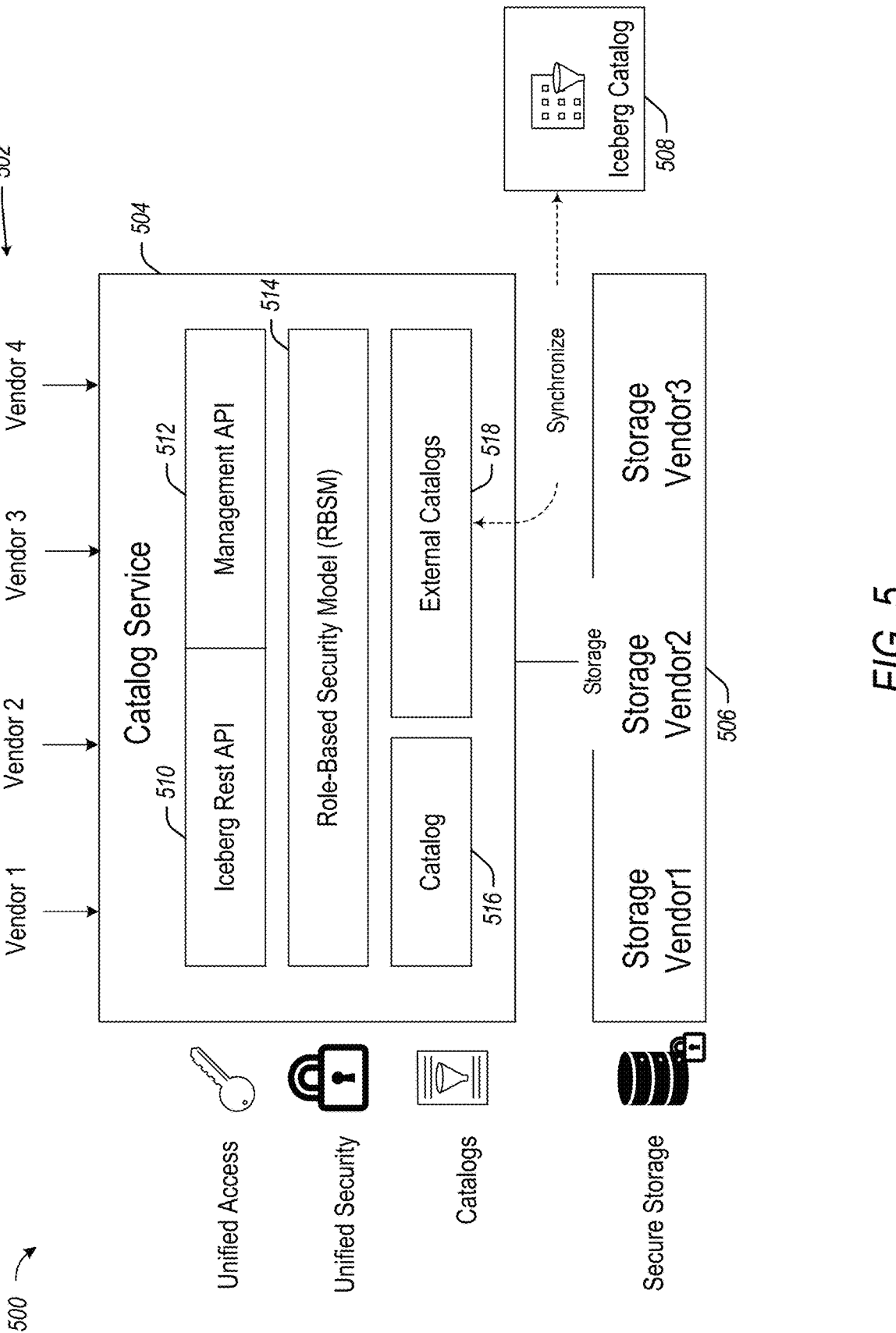
FIG. 5 is a diagram of a catalog service, in accordance with some embodiments of the present disclosure.

FIG. 5 is a diagram 500 of a catalog service 504, in accordance with some embodiments of the present disclosure. Referring to FIG. 5, catalog service 504 can be configured by CM 128 and can include a REST API 510

(e.g., an Iceberg REST API), a management API 512, a role-based security model 514, one or more catalogs (e.g., catalog 516), and an external catalog 518 (which can be a read-only catalog that is synchronized with another catalog 508 that is external to the catalog service 504). Catalog 516 can include one or more data objects (e.g., tables, views, etc.) which can be stored in one or more storage locations 506 (e.g., as provided by at least one storage provider vendor.

In some aspects, catalog service 504 can be configured to provide vendors 502 (e.g., using different NBDSs) with access to catalog 516 via the REST API 510. Management API 512 can be used to access and configure the role-based security model 514 (also referred to as RBSM 514). In some aspects, RBSM 514 can provide an authentication (or privilege) model specifying which users can access catalog 516 and configure role-based access management (e.g., as explained further below in reference to FIG. 6).

Figure 6:
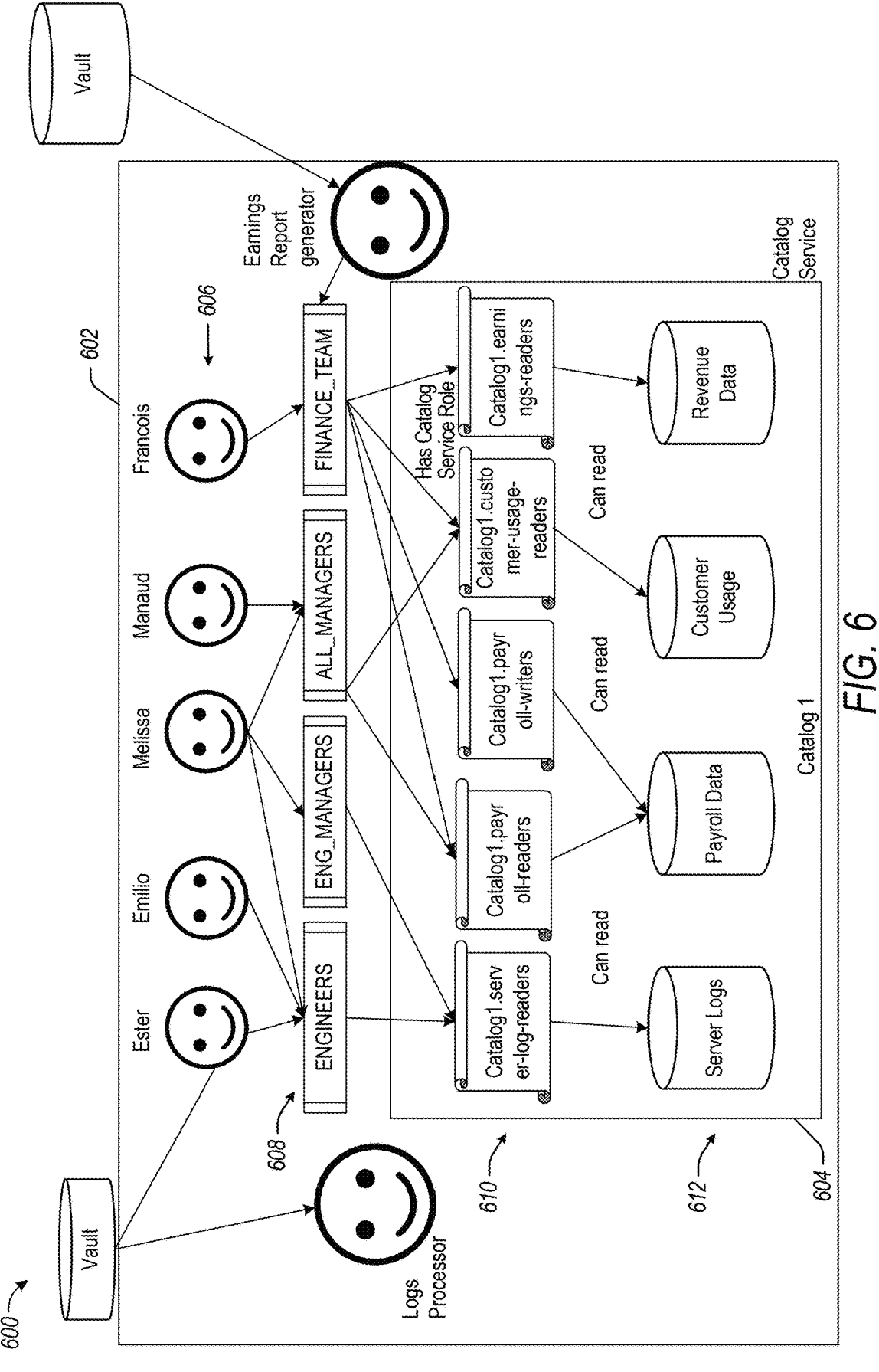
FIG. 6 is a more detailed diagram of a catalog service configured with users, user roles, and catalog roles, in accordance with some embodiments of the present disclosure.

FIG. 6 is a more detailed diagram 600 of a catalog service 602 configured with users, user roles, and catalog roles, in accordance with some embodiments of the present disclosure. Referring to FIG. 6, catalog service 602 can include additional configurations that can be used to implement the RBSM, such as users 606 (also referred to as principals 606), principal roles 608 (also referred to as assumable principals or assumable roles), and catalog roles 610 (also referred to as permission-expansion roles). As illustrated in FIG. 6, catalog roles 610 can be configured inside catalog 604 and can be used to access securables 612 (e.g., at least one of a namespace, a table, and a view).

In some aspects, privileges can be set at any catalog level (e.g., at a namespace level, at catalog level, etc.). In some aspects, the RBSM can be configured to provide authentication for one or more namespaces including nested namespaces.

In some aspects, the RBSM can provide a privilege model including privileges to access data-related items (e.g., reading or processing data stored as securables 612). In some aspects, the privilege model can include service management access (e.g., based on privileges for conducting administration-related tasks). The service management access of the privilege model can be configured via the management API 512. In some aspects, the RBSM can configure privileges for catalog management access (e.g., to manage access associated with single or multiple catalogs within a catalog service).

In some aspects, principals 606 can be humans or 3rd party federated identities or could represent a machine (if keypairs or hardware certificates are used to manage credential exchanges). Non-machine users can interact with a Web-based user interface (UI). Principals 606 can be described as an identity (who seeks access to a catalog). In some aspects, customers with end-to-end auditing can attribute all actions to an original identity.

In some aspects, principal roles 608 can be considered as the "doors/windows" into an environment and can encompass a business function. These may not be a fundamental "identity" in that a "user" must be the one to first "assume/USE" this role. This can be considered as a PRIMARY_ROLE for a user of NBDS 102. In some aspects, a principal role can be described as a business function (e.g., why the user seeks access). This is the "hat" a user wears when a user serves multiple business functions. Examples include ENGINEER, DATALAKE_TEAM_MEMBER, DATA_SCIENTIST, and TESTER.

In some aspects, the catalog roles 610 are roles assigned to the assumable roles (e.g., principal roles 608) and can be used for convenience to hold bags of grants. These can be similar to using SECONDARY_ROLES and DATABASE ROLES in NBDS 102. The catalog roles can be described as a collection of privileges on securables (e.g., what data the user seeks access to). The catalog roles can make it more convenient to manage collections of related objects. Examples include LOGS_READER, CUSTOMER_USAGE_READER, and CUSTOMER_USAGE_WRITER.

Figure 7:
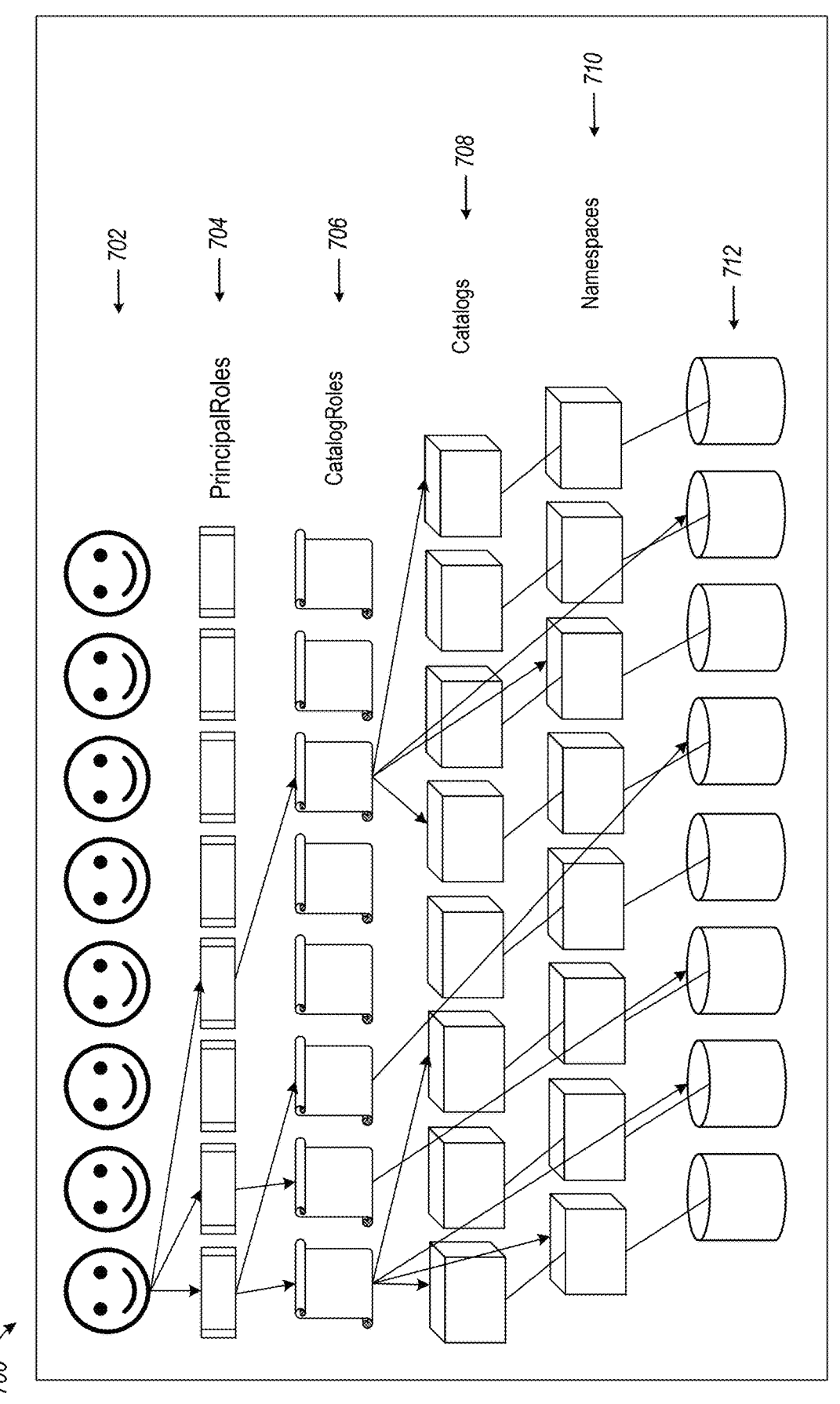
FIG. 7 is a diagram of an example catalog service hierarchy, in accordance with some embodiments of the present disclosure.

FIG. 7 is diagram 700 of an example catalog service hierarchy, in accordance with some embodiments of the present disclosure. Referring to FIG. 7, diagram 700 illustrates roles and grants assigned in connection with accessing securables 712 (e.g., tables and views) via catalogs 708 and namespaces 710. More specifically, principals 702 are associated with principal roles 704, which are associated with catalog roles 706. One or more of the catalog roles 706 can be part of one or more of the catalogs 708. In some aspects, namespaces 710 can include nested namespaces.

Figure 8:
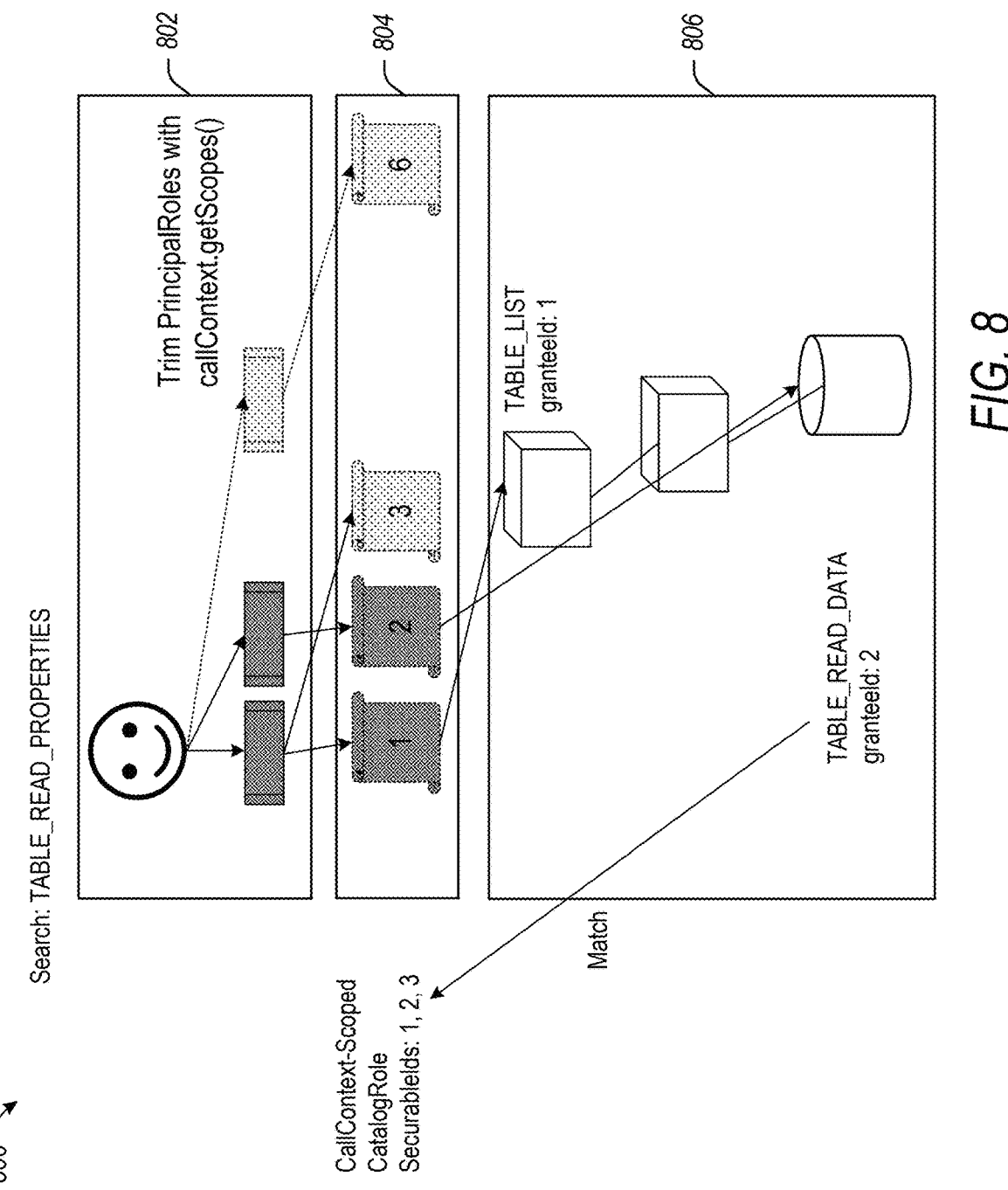
FIG. 8 is a diagram of a request flow for servicing a catalog access request using a catalog service, in accordance with some embodiments of the present disclosure.

FIG. 8 is a diagram of a request flow 800 for servicing a catalog access request using a catalog service, in accordance with some embodiments of the present disclosure. At operation 802, a table access request is received, with the request including identification information of the user (or principal). The request can also include an indication of a principal role (or roles) or the principal role(s) can be determined based on the principal indication. At operation 804, catalog roles are resolved (determined) based on the determined principal roles.

Processing can also be performed from the bottom up where, at operation 806, the relevant securables are accessed (e.g., a table is accessed based on the table access request), and dependency of the securables to one or more namespaces is determined. Once the namespaces are determined, the access privileges of the involved namespaces are resolved against the access privileges associated with the catalog roles determined at operation 804. If the access privileges are resolved, access to the securables is granted to complete the received table access request.

In some aspects, CM 128 can define the following set of object types used in connection with catalog service configuration:

(1) NBDS Account of Type Catalog Service.

(1.a) The catalog service may not include the concept of an account, but when integrated with the NBDS, a dedicated NBDS account of type Catalog Service can be provisioned. In some aspects, only one such account might exist in the organization of the NBDS customer. In some aspects, this account might be referred to as Catalog Service NBDS account.

(2) Principal.

(2.a) Represents an external entity that will connect into the system to perform operations.

(2.b) Parent: Catalog Service NBDS account when integrated with NBDS or none otherwise.

(2.c) Properties.

(2.c.i) Name.

(2.c.ii) Type: USER or SERVICE.

(2.c.iii) SERVICE: ClientID (contains the OAuth Client ID), ClientSecret (contains the OAuth Client Secret), and GrantTypes (contains the enabled OAuth Grant Types).

(2.c.iv) USER: LoginEmail (contains the user's email address), Password (contains the user's password), and First name: last name: (contains user information).

(2.c.v) USER or SERVICE: Description; Activated (indicates if the principal is active; if not, the ClientSecret or Password needs to be reset).

(3) PrincipalRole.

(3.a) Represents a group of Principal with the same functional role.

(3.b) Parent: Catalog Service NBDS account when integrated with NBDS or none otherwise.

(3.c) Can be granted to Principals. In some aspects, a PrincipalRole is akin to an account-level role, a Principal is like a user, and an account-evel role can be granted to users.

(3.d) Properties: Name.

(4) Catalog. Can define an Iceberg Catalog. Parent is Catalog Service NBDS Account when integrated with NBDS or none otherwise.

(5) Namespace. Defines an Iceberg Namespace (or Another Type of Namespace). Parent can be Catalog or Another Namespace.

(6) Table. Defines an Iceberg Table (or Another Type of Table). Parent is Namespace.

(7) CatalogRole. Defines an Object Aggregating Privileges on Objects Defined in a Catalog, or on the Catalog itself. Parent is Catalog. Can be Granted to PrincipalRoles. Properties include Name.

In some aspects, CM 128 can configure a catalog service (also referred to as a catalog service account) with an RBSM using the privileges illustrated in FIG. 9-FIG. 12.

Figure 9:
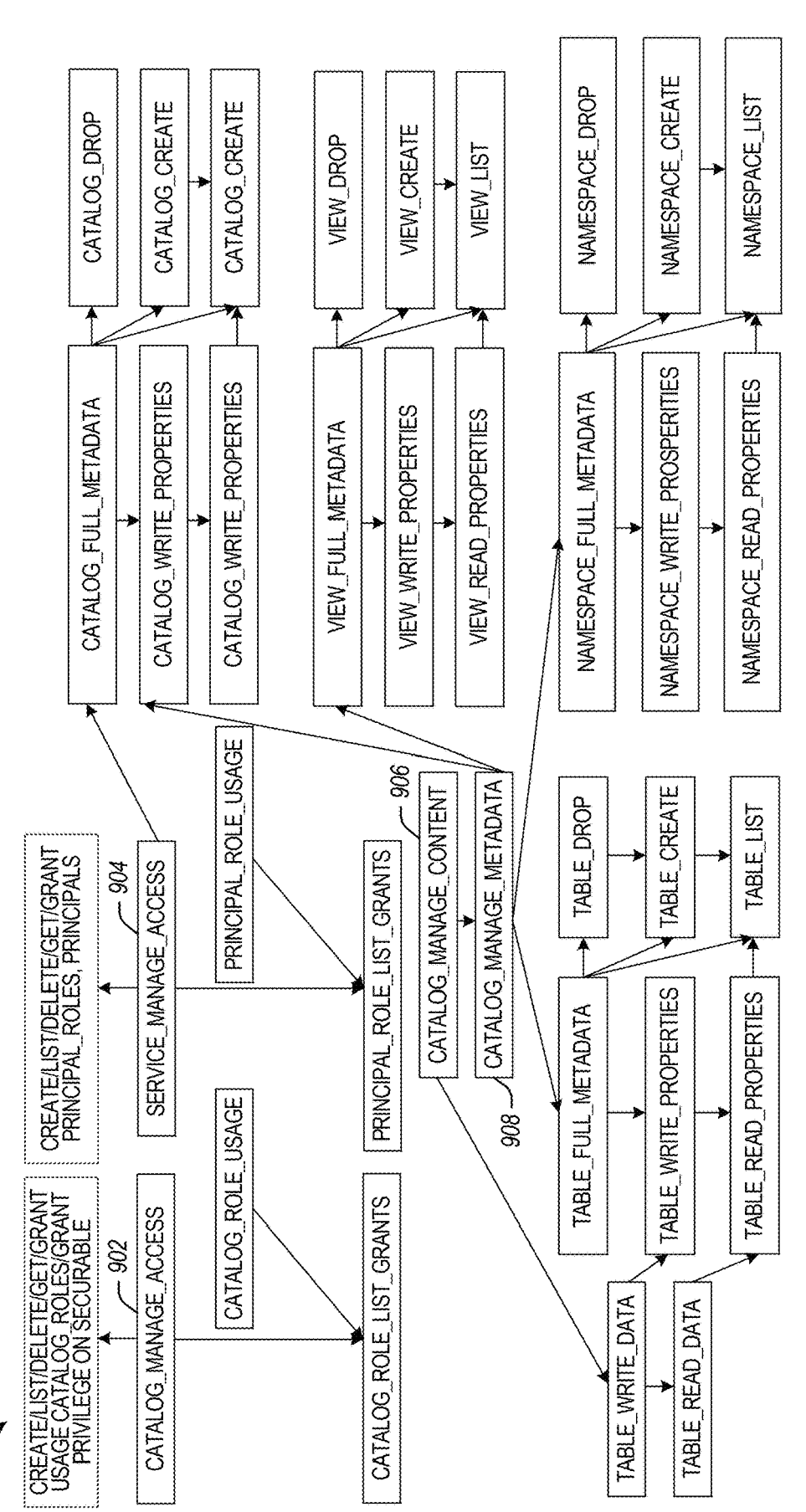
FIG. 9 illustrates an expanded graph of privileges relating to catalog objects and administration objects used by a catalog service, in accordance with some embodiments of the present disclosure.

FIG. 9 illustrates an expanded graph of privileges 900 relating to catalog objects and administration objects used by a catalog service, in accordance with some embodiments of the present disclosure. Referring to FIG. 9, privileges 900 can include a catalog management access privilege 902 (e.g., CATALOG_MANAGE_ACCESS), a service management access privilege 904 (e.g., SERVICE_MANAGE_AC-CESS), catalog content management privilege 906 (e.g., CATALOG_MANAGE_CONTENT), and catalog metadata management privilege 908 (e.g., CATALOG_MAN-AGE_METADATA) with corresponding sub-privileges as illustrated in FIG. 9.

In some aspects, the catalog management functions associated with the catalog management privileges can be accessed via the REST API 510. In some aspects, service management functions associated with the service management privileges can be accessed via the management API 512.

In some aspects, most privileges can be satisfiable by any of their parent "super-privileges," especially due to the way Iceberg works (writing data fundamentally requires reading data and reading/writing properties). TABLE_CREATE implicitly means TABLE_WRITE_PROPERTIES on the single table being created. In some aspects, the CM 128 can keep TABLE_CREATE separate from TABLE_WRITE_DATA and TABLE_WRITE_PROPERTIES because table creation requires TABLE_CREATE on the parent namespace, whereas users may prefer to only grant TABLE_WRITE_PROPERTIES on individual tables after creation.

Workflows that explicitly create tables and update them can be granted both TABLE_CREATE and TABLE_WRITE_PROPERTIES.

In some aspects, CM 128 can design workflows that can safely be allowed to "import" external tables by calling registerTable without giving that workflow any privilege to even read existing table metadata or drop existing tables, by only granting the TABLE_CREATE privilege. Out of necessity, the TABLE_CREATE privilege does, however, confer the TABLE_LIST privilege implicitly.

FIG. 10 illustrates a diagram with an example privilege structure 1000 used in connection with the privileges of FIG. 9, in accordance with some embodiments of the present disclosure. In some aspects, each privilege entity type can contain the same basic privilege structure 1000 for CRUDL operations (e.g., Create/Read/Update/Delete/List operations). As illustrated in FIG. 10, each type contains the same CRUDL subgraph with a parent privilege_FULL_META-DATA as the parent.

Figure 11:
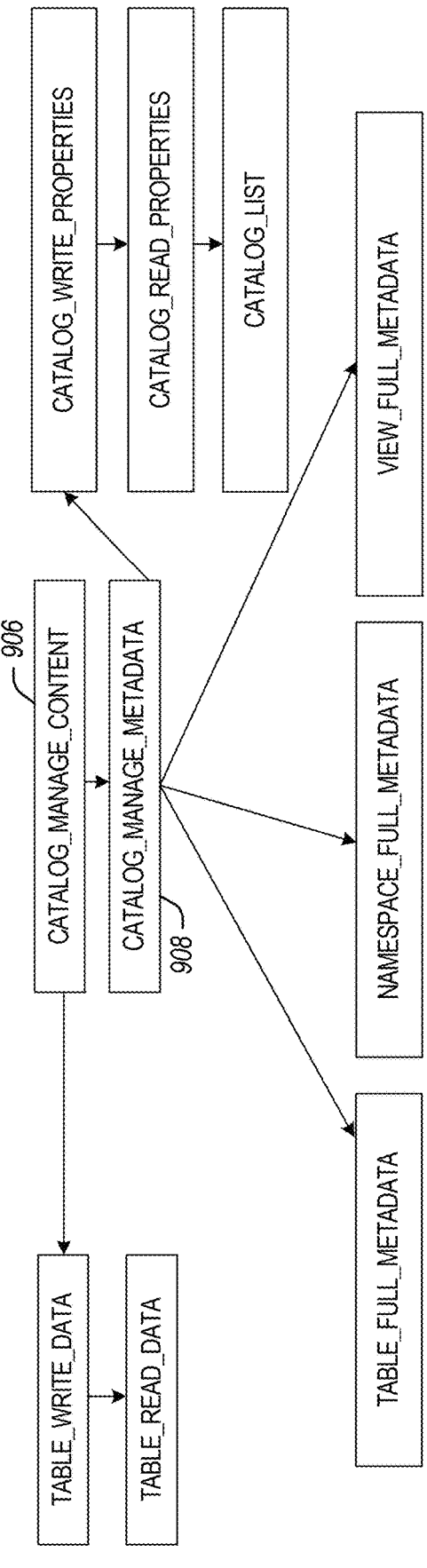
FIG. 11 illustrates a diagram of a sub-graph of content-related privileges used by a catalog service, in accordance with some embodiments of the present disclosure.

FIG. 11 illustrates a diagram of a sub-graph of content-related privileges 1100 used by a catalog service, in accordance with some embodiments of the present disclosure. Referring to FIG. 11, the content-related privileges 1100 can include collapsing CRUDL sub-graphs for catalog content-related privileges, including catalog content management privilege 906 (e.g., CATALOG_MANAGE_CONTENT), and catalog metadata management privilege 908 (e.g., CATALOG_MANAGE_METADATA).

Figure 12:
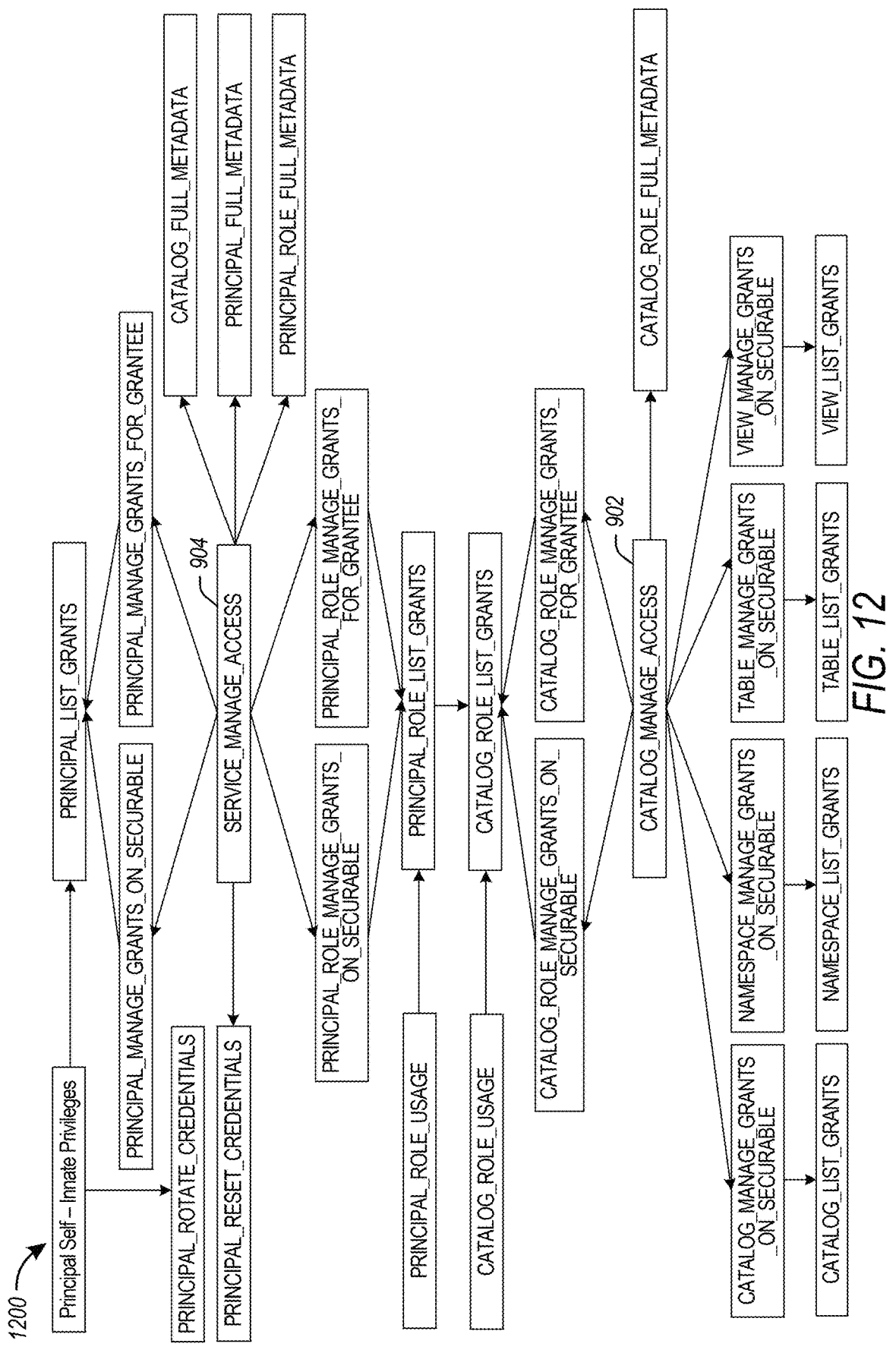
FIG. 12 illustrates a diagram of a sub-graph of access-management-related privileges used by a catalog service, in accordance with some embodiments of the present disclosure.

FIG. 12 illustrates a diagram of a sub-graph of access-management-related privileges 1200 used by a catalog service, in accordance with some embodiments of the present disclosure. Referring to FIG. 12, the access-management-related privileges 1200 can include sub-graphs of privileges centered on the catalog management access privilege 902 (e.g., CATALOG_MANAGE_ACCESS) and the service management access privilege 904 (e.g., SERVICE_MAN-AGE_ACCESS).

In some aspects, CM 128 can configure the catalog service RBSM to associate catalog-based and admin-based operations (e.g., called via an API) with privileges applied to certain primary and secondary targets as listed below.

In some aspects, operation LIST_NAMESPACES can be associated with the privilege NAMESPACE_LIST applied to Namespace and Catalog.

In some aspects, operation CREATE_NAMESPACE can be associated with the privilege NAMESPACE_CREATE applied to Namespace and Catalog (parent of the object being created).

In some aspects, operation LOAD_NAMESPACE_M-ETADATA can be associated with the privilege NAMESPACE_READ_PROPERTIES applied to Namespace.

In some aspects, operation NAMESPACE_EXISTS can be associated with privilege NAMESPACE_LIST/ NAMESPACE_REFERENCE* applied to Namespace.

In some aspects, operation DROP_NAMESPACE can be associated with the privilege NAMESPACE_DROP applied to Namespace.

In some aspects, operation UPDAT-E_NAMESPACE_PROPERTIES can be associated with the privilege NAMESPACE_WRITE_PROPERTIES applied to Namespace.

In some aspects, operation LIST_TABLES can be associated with the privilege TABLE_LIST applied to Namespace.

In some aspects, operation CREATE_TABLE_DIRECT can be associated with the privilege TABLE_CREATE applied to Namespace (parent of the object being created).

In some aspects, operation CREATE_TABLE_STAGED can be associated with the privilege TABLE_CREATE applied to Namespace (parent of the object being created).

In some aspects, operation CREATE_TABLE_ STAGED_WITH_WRITE_DELEGATION can be associated with privileges TABLE_CREATE and TABLE_WRITE_DATA applied to Namespace (parent of the object being created).

In some aspects, operation REGISTER_TABLE can be associated with the privilege TABLE_CREATE applied to Namespace (parent of the object being created).

In some aspects, operation LOAD_TABLE can be associated with privilege TABLE_READ_PROPERTIES applied to Table.

In some aspects, operation LOAD_TABLE_WITH_WRITE_DELEGATION can be associated with privilege TABLE_WRITE_DATA applied to Table.

In some aspects, operation UPDATE_TABLE can be associated with privilege TABLE_WRITE_PROPERTIES applied to Table.

In some aspects, operation UPDATE_TABLE_FOR_STAGED_CREATE can be associated with the privilege TABLE_CREATE applied to Namespace (parent of the object being created).

In some aspects, operation DROP_TABLE_WITHOUT_PURGE can be associated with privilege TABLE_DROP applied to Table.

In some aspects, operation DROP_TABLE_WITH_PURGE can be associated with privileges TABLE_DROP and TABLE_WRITE_DATA applied to Table.

In some aspects, operation TABLE_EXISTS can be associated with privilege TABLE_LIST/TABLE_REFERENCE* applied to Table.

In some aspects, operation RENAME_TABLE can be associated with the privilege TABLE_DROP applied to Table (src) and Namespace (dst) (optional).

In some aspects, operation COMMIT_TRANSACTION can be associated with privilege TABLE_WRITE_PROPERTIES and TABLE_CREATE** applied to List<Table>.

In some aspects, operation LIST_VIEWS can be associated with the privilege VIEW_LIST applied to Namespace.

In some aspects, operation CREATE_VIEW can be associated with the privilege VIEW_CREATE applied to Namespace (parent of object created).

In some aspects, operation LOAD_VIEW can be associated with privilege VIEW_READ_PROPERTIES applied to View.

In some aspects, operation REPLACE_VIEW can be associated with the privilege VIEW_WRITE_PROPERTIES applied to View.

In some aspects, operation DROP_VIEW can be associated with the privilege VIEW_DROP applied to View.

In some aspects, operation VIEW_EXISTS can be associated with privilege VIEW_LIST/VIEW_REFERENCE* applied to View.

In some aspects, operation RENAME_VIEW can be associated with the privilege VIEW_DROP applied to View and Namespace (optional).

In some aspects, operation REPORT_NOTIFICATIONS can be associated with privilege TABLE_CREATE, TABLE_WRITE_PROPERTIES, TABLE_DROP, NAMESPACE_CREATE AND NAMESPACE_DROP applied to Table, Namespace and Catalog.

In some aspects, operation LIST_CATALOGS can be associated with the privilege CATALOG_LIST applied to Account.

In some aspects, operation CREATE_CATALOG can be associated with the privilege CATALOG_CREATE applied to Account.

In some aspects, operation GET_CATALOG can be associated with the privilege CATALOG_READ_PROPERTIES applied to Catalog.

In some aspects, operation UPDATE_CATALOG can be associated with the privilege CATALOG_WRITE_PROPERTIES applied to Catalog.

In some aspects, operation DELETE_CATALOG can be associated with the privilege CATALOG_DROP applied to Catalog.

In some aspects, operation LIST_PRINCIPALS can be associated with the privilege PRINCIPAL_LIST applied to Account.

In some aspects, operation CREATE_PRINCIPALS can be associated with the privilege PRINCIPAL_CREATE applied to Account.

In some aspects, operation GET_PRINCIPAL can be associated with the privilege PRINCIPAL_READ_PROPERTIES or N/A applied to Principal.

In some aspects, operation UPDATE_PRINCIPAL can be associated with the privilege PRINCIPAL_WRITE_PROPERTIES or N/A applied to Principal.

In some aspects, operation DELETE_PRINCIPAL can be associated with the privilege PRINCIPAL_DROP applied to Principal.

In some aspects, operation ROTATE_CREDENTIALS can be associated with the privilege PRINCIPAL_ROTATE_CREDENTIALS or N/A applied to Principal.

In some aspects, operation RESET_CREDENTIALS can be associated with the privilege PRINCIPAL_RESET_CREDENTIALS applied to Principal.

In some aspects, operation LIST_PRINCIPAL_ROLES_ASSIGNED can be associated with the privilege PRINCIPAL_LIST_GRANTS or N/A applied to Principal.

In some aspects, operation ASSIGN_PRINCIPAL_ROLE can be associated with the privilege PRINCIPAL_ROLE_MANAGE_GRANTS_ON_SECURABLE applied to PrincipalRole and Principal.

In some aspects, operation REVOKE_PRINCIPAL_ROLE can be associated with privilege PRINCIPAL_ROLE_MANAGE_GRANTS_ON_SECURABLE applied to PrincipalRole and Principal.

In some aspects, operation LIST_PRINCIPAL_ROLES can be associated with the privilege PRINCIPAL_ROLE_LIST applied to Account.

In some aspects, operation CREATE_PRINCIPAL_ROLE can be associated with the privilege PRINCIPAL_ROLE_CREATE applied to Account.

In some aspects, operation GET_PRINCIPAL_ROLE can be associated with the privilege PRINCIPAL_ROLE_READ_PROPERTIES applied to PrincipalRole.

In some aspects, operation UPDATE_PRINCIPAL_ROLE can be associated with the privilege PRINCIPAL_ROLE_UPDATE_PROPERTIES applied to PrincipalRole.

In some aspects, operation DELETE_PRINCIPAL_ROLE can be associated with the privilege PRINCIPAL_ROLE_DROP applied to PrincipalRole.

In some aspects, operation LIST_ASSIGNEE_PRINCIPALS_FOR_PRINCIPAL_ROLE can be associated with the privilege PRINCIPAL_ROLE_LIST_GRANTS applied to PrincipalRole.

In some aspects, operation LIST_CATALOG_ROLES_FOR_PRINCIPAL_ROLE can be associated with the privilege PRINCIPAL_ROLE_LIST_GRANTS applied to PrincipalRole.

In some aspects, operation ASSIGN_CATALOG_ROLE_TO_PRINCIPAL_ROLE can be associated with privilege CATALOG_ROLE_MANAGE_GRANTS_ON_SECURABLE applied to CatalogRole and PrincipalRole.

In some aspects, operation REVOKE_CATALOG_ROLE_FROM_PRINCIPAL_ROLE can be associated with privilege CATALOG_ROLE_MANAGE_GRANTS_ON_SECURABLE applied to CatalogRole and PrincipalRole.

In some aspects, operation LIST_CATALOG_ROLES can be associated with the privilege CATALOG_ROLE_LIST applied to Catalog.

In some aspects, operation CREATE_CATALOG_ROLE can be associated with the privilege CATALOG_RO-LE_CREATE applied to Catalog.

In some aspects, operation GET_CATALOG_ROLE can be associated with the privilege CATALOG_ROL-E_READ_PROPERTIES applied to CatalogRole.

In some aspects, operation UPDATE_CATALOG_ROLE can be associated with the privilege CATALOG_ROLE_WRITE_PROPERTIES applied to CatalogRole.

In some aspects, operation DELETE_CATALOG_ROLE can be associated with the privilege CATALOG_ROLE_DROP applied to CatalogRole.

In some aspects, operation LIST_ASSIGNEE_PRINCIPAL_ROLES_FOR_CATALOG_ROLE can be associated with privilege CATALOG_ROLE_LIST_GRANTS applied to CatalogRole.

In some aspects, operation LIST_GRANTS_FOR_CATALOG_ROLE can be associated with the privilege CATALOG_ROLE_LIST_GRANTS applied to CatalogRole.

In some aspects, operation ADD_ROOT_GRANT_TO_PRINCIPAL_ROLE can be associated with the privilege SERVICE_MANAGE_ACCESS applied to Account and PrincipalRole.

In some aspects, operation REVOKE_ROOT_GRANT_FROM_PRINCIPAL_ROLE can be associated with the privilege SERVICE_MANAGE_ACCESS applied to Account and PrincipalRole.

In some aspects, operation LIST_GRANTS_ON_ROOT can be associated with the privilege SERVICE_MANAGE_ACCESS applied to Account.

In some aspects, operation ADD_PRINCIPAL_GRANT_TO_PRINCIPAL_ROLE can be associated with privilege PRINCIPAL_MANAGE_GRANTS_ON_SECURABLE applied to Principal and PrincipalRole.

In some aspects, operation REVOKE_PRINCIPAL_GRANT_FROM_PRINCIPAL_ROLE can be associated with privilege PRINCIPAL_MANAGE_GRANTS_ON_SECURABLE applied to Principal and PrincipalRole.

In some aspects, operation LIST_GRANTS_ON_PRINCIPAL can be associated with the privilege PRINCIPAL_LIST_GRANTS applied to Principal.

In some aspects, operation ADD_PRINCIPAL_ROLE_GRANT_TO_PRINCIPAL_ROLE can be associated with privilege PRINCIPAL_ROLE_MANAGE_GRANTS_ON_SECURABLE applied to PrincipalRole and PrincipalRole.

In some aspects, operation REVOKE_PRINCIPAL_ROLE_GRANT_FROM_PRINCIPAL_ROLE can be associated with privilege PRINCIPAL_ROLE_MANAGE_GRANTS_ON_SECURABLE applied to PrincipalRole and PrincipalRole.

In some aspects, operation LIST_GRANTS_ON_PRINCIPAL_ROLE can be associated with the privilege PRINCIPAL_ROLE_LIST_GRANTS applied to PrincipalRole.

In some aspects, operation ADD_CATALOG_ROLE_GRANT_TO_CATALOG_ROLE can be associated with privilege CATALOG_ROLE_MANAGE_GRANTS_ON_SECURABLE applied to CatalogRole and CatalogRole.

In some aspects, operation REVOKE_CATALOG_ROLE_GRANT_FROM_CATALOG_ROLE can be associated with privilege CATALOG_ROLE_MANAGE_GRANTS_ON_SECURABLE applied to CatalogRole and CatalogRole.

In some aspects, operation LIST_GRANTS_ON_CATALOG_ROLE can be associated with the privilege CATALOG_ROLE_LIST_GRANTS applied to CatalogRole.

In some aspects, operation ADD_CATALOG_GRANT_TO_CATALOG_ROLE can be associated with privilege CATALOG_MANAGE_GRANTS_ON_SECURABLE applied to Catalog and CatalogRole.

In some aspects, operation REVOKE_CATALOG_GRANT_FROM_CATALOG_ROLE can be associated with privilege CATALOG_MANAGE_GRANTS_ON_SECURABLE applied to Catalog and CatalogRole.

In some aspects, operation LIST_GRANTS_ON_CATALOG can be associated with privilege CATALOG_LIST_GRANTS applied to Catalog.

In some aspects, operation ADD_NAMESPACE_GRANT_TO_CATALOG_ROLE can be associated with privilege NAMESPACE_MANAGE_GRANTS_ON_SECURABLE applied to Namespace and CatalogRole.

In some aspects, operation REVOKE_NAMESPACE_GRANT_FROM_CATALOG_ROLE can be associated with privilege NAMESPACE_MANAGE_GRANTS_ON_SECURABLE applied to Namespace and CatalogRole.

In some aspects, operation LIST_GRANTS_ON_NAMESPACE can be associated with the privilege NAMESPACE_LIST_GRANTS applied to Namespace.

In some aspects, operation ADD_TABLE_GRANT_TO_CATALOG_ROLE can be associated with privilege TABLE_MANAGE_GRANTS_ON_SECURABLE applied to Table and CatalogRole.

In some aspects, operation REVOKE_TABLE_GRANT_FROM_CATALOG_ROLE can be associated with the privilege TABLE_MANAGE_GRANTS_ON_SECURABLE applied to Table and CatalogRole.

In some aspects, operation LIST_GRANTS_ON_TABLE can be associated with privilege TABLE_LIST_GRANTS applied to Table.

In some aspects, the operation ADD_VIEW_GRANT_TO_CATALOG_ROLE can be associated with the privilege VIEW_MANAGE_GRANTS_ON_SECURABLE, which is applied to View and CatalogRole.

In some aspects, the operation REVOKE_VIEW_GRANT_FROM_CATALOG_ROLE can be associated with the privilege VIEW_MANAGE_GRANTS_ON_SECURABLE, which is applied to View and CatalogRole.

In some aspects, operation LIST_GRANTS_ON_VIEW can be associated with the privilege VIEW_LIST_GRANTS applied to View.

In some aspects, the CM 128 can provide a management REST API (e.g., management API 512) to create and manage catalogs as well as create and manage users, roles, and permission grants. An additional description of how a catalog service manages its metadata and configures fine-grained access control for it is provided below.

In some aspects, CM 128 uses role-based access control (RBAC) to enable catalog administrators to control how resources defined in a catalog are secured. The RBAC configurations are described below.

In some aspects, CM 128 bootstraps Iceberg metadata by creating an Iceberg account and, within that account, an Iceberg catalog named "root." In this root catalog, CM 128 also creates two objects to bootstrap the management of the root catalog:

(a) An admin role. The admin role is created when a new catalog is created. Primarily, the admin role in a catalog allows one to manage that catalog. However, for the root catalog, this role is more powerful and allows one to manage the account. Because this initial admin role is part of bootstrapping the new catalog, it cannot be altered or dropped. This role has the following privileges:

(a.1) Manage account: will be granted only to the (root) admin role, i.e., the admin role of the root catalog. In particular, this privilege is required to be able to list catalogs and create (and drop) new catalogs. Note that the root catalog cannot be dropped. When a new catalog is created, it will be bootstrapped like the root catalog, except that the admin role of a newly created catalog will not be granted the "manage account" privilege.

(a.2) Manage catalog: This privilege allows the creation, alteration, and drop of roles in the catalog. Like the manage account role, the manage catalog role is a special privilege only granted to the catalog admin role. It allows the admin to create new roles in the catalog and grant/revoke privileges to these roles. The MANAGE catalog role also allows a list of roles and principals in the catalog.

(a.3) Manage namespace. This privilege will be granted to the entire catalog, allowing the catalog admin to create/alter/drop namespaces at any level. This is granted as a convenience.

(b) An admin principal. To interact with the catalog using the Iceberg REST API, one needs a principal to access the catalog via the Iceberg REST API. A principal has a few primary attributes:

(b.1) Credentials. This is what is required to access the catalog since credentials are required to authenticate with the service and get an OAuth access token. These credentials are a key/secret pair.

(b.2) Roles. These define the set of roles the caller will be granted when authenticating using this principal. At bootstrap time, the admin principal will be granted the admin role of the catalog.

(b.3) Root namespace. This is optional. If set, all rest calls made on behalf of this principal will be rooted by the specified namespace and will be relative to it, as if this namespace was the root of the catalog. For example, if this root namespace is set to [N1, N2], and the caller creates a table T in the namespace [A, B], the table T will be created in the namespace [N1, N2, A, B].

(b.4) Activated. If false, the principal needs to be activated before being usable. Basically, activating a principal will automatically rotate the credentials and then set the activated property to true. The newly created credentials are returned to the caller when it activates the principal. By default, a new principal needs to be activated.

Figure 13:
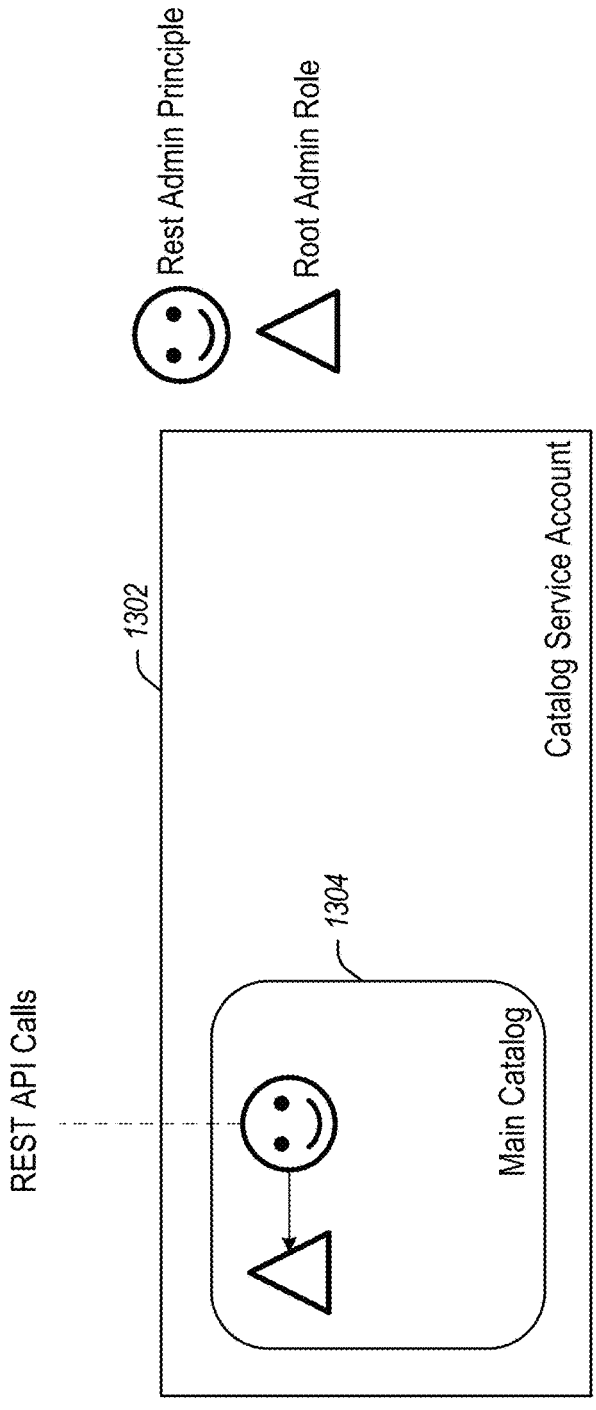
FIG. 13 is a diagram of a catalog service account at the time of creation, in accordance with some embodiments of the present disclosure.

FIG. 13 is a diagram 1300 of a catalog service account 1302 at the time of creation, in accordance with some embodiments of the present disclosure. Referring to FIG. 13, at the time the catalog service account 1302 is created via an API call, a main catalog 1304 is also created (e.g., by a REST admin principal with a root admin role).

Figure 14:
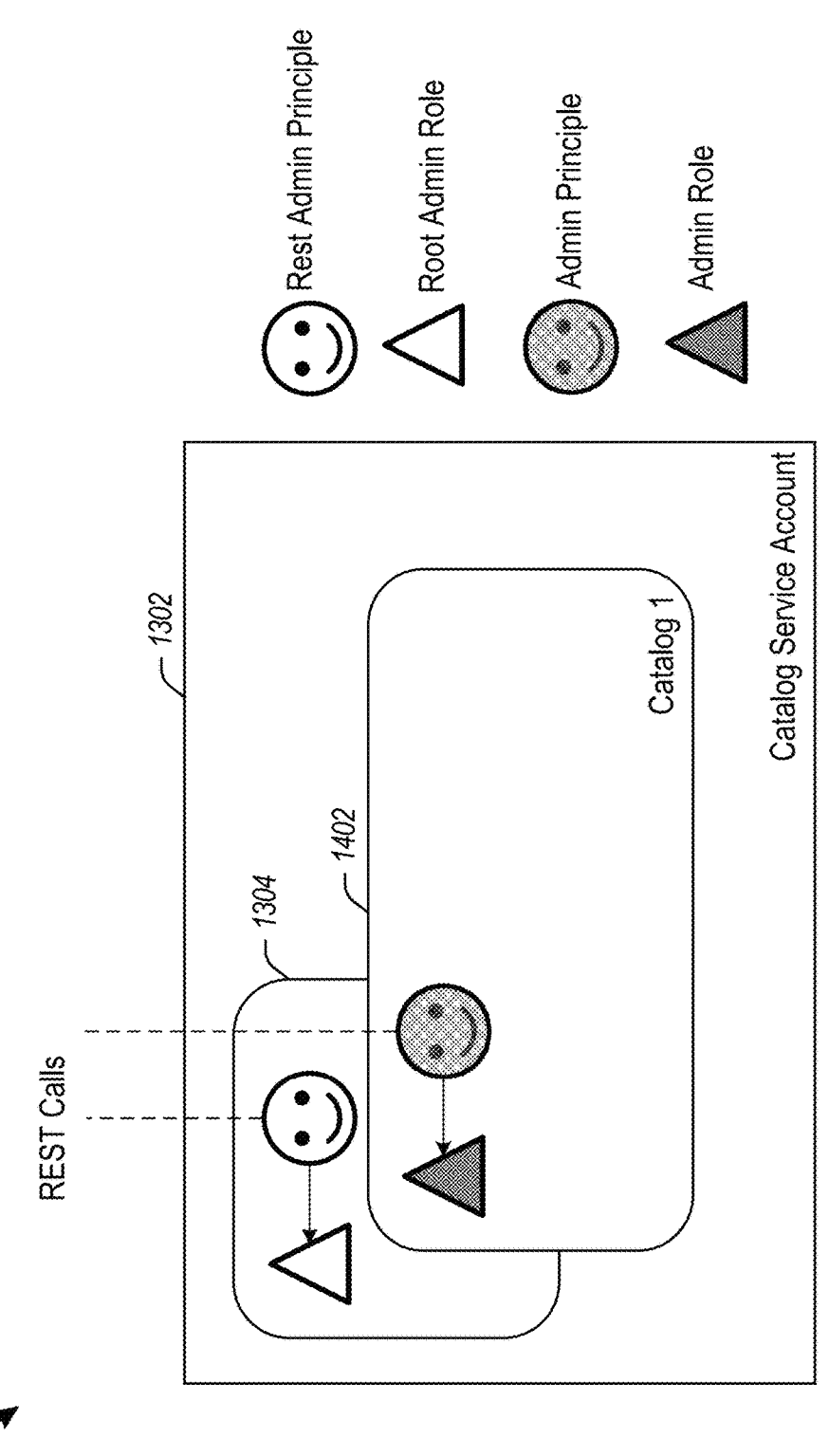
FIG. 14 is a diagram of a catalog service account after a root catalog admin creates a new catalog, in accordance with some embodiments of the present disclosure.

FIG. 14 is a diagram 1400 of a catalog service account after a root catalog admin creates a new catalog, in accordance with some embodiments of the present disclosure. Referring to FIG. 14, the root catalog admin is granted extra privileges to create new catalogs. For example, the root catalog admin can create a new catalog 1402 named "catalog1."

Similar to the root catalog, this new catalog, "catalog1," will also be created with a built-in admin principal and associated role. Unlike the admin role of the root Iceberg catalog, this new admin role has only catalog-level privileges and cannot manage other catalogs. Also, when the root admin creates a new catalog, it can specify if the admin principal of the new catalog needs to be activated or not. In all cases, the catalog creation call returns the credentials assigned to the admin principal that was just created. This is required to manage the new catalog via REST from its inception.

In some aspects, a catalog admin role allows management of the catalog to which it belongs. This can be achieved using the following four sets of catalog-level privileges:

(a) Manage principals in the catalog. Create new ones (with or without activation), drop existing ones, and reset existing principals. Resetting a principal will rotate the credential and optionally force an activation.

(b) Create or drop roles in that catalog. The catalog admin role itself cannot be dropped.

(c) Grant or revoke privileges on any securable defined in the catalog (i.e., namespace, table, view) to any catalog roles, except for the catalog-admin role, which is immutable. Roles defined in an Iceberg catalog are not account-level entities like for Snowflake but instead are catalog-level entities (similar to database roles in the NBDS). Each catalog role only defines privileges for the catalog it is associated with and can only target securable entities defined in that catalog. An exception is the root admin role, which has more account-level power since that role can create/drop other catalogs and reset the credentials of principals in other catalogs. But even those roles cannot operate on remote securables.

(d) Grant/revoke roles to any principal in the catalog.

These privileges can be combined under the single "manage catalog" privilege. The catalog admin can create a new principal each time a new tool requires accessing the catalog from the outside. For example, say that both a Spark cluster and an NBDS account need access to the same catalog. The catalog admin will create two separate principal objects, one for Spark and one for the NBDS account. It is also likely that these two tools will be granted different sets of privileges; hence, the catalog admin will also create two distinct roles, one for each principal.

Figure 15:
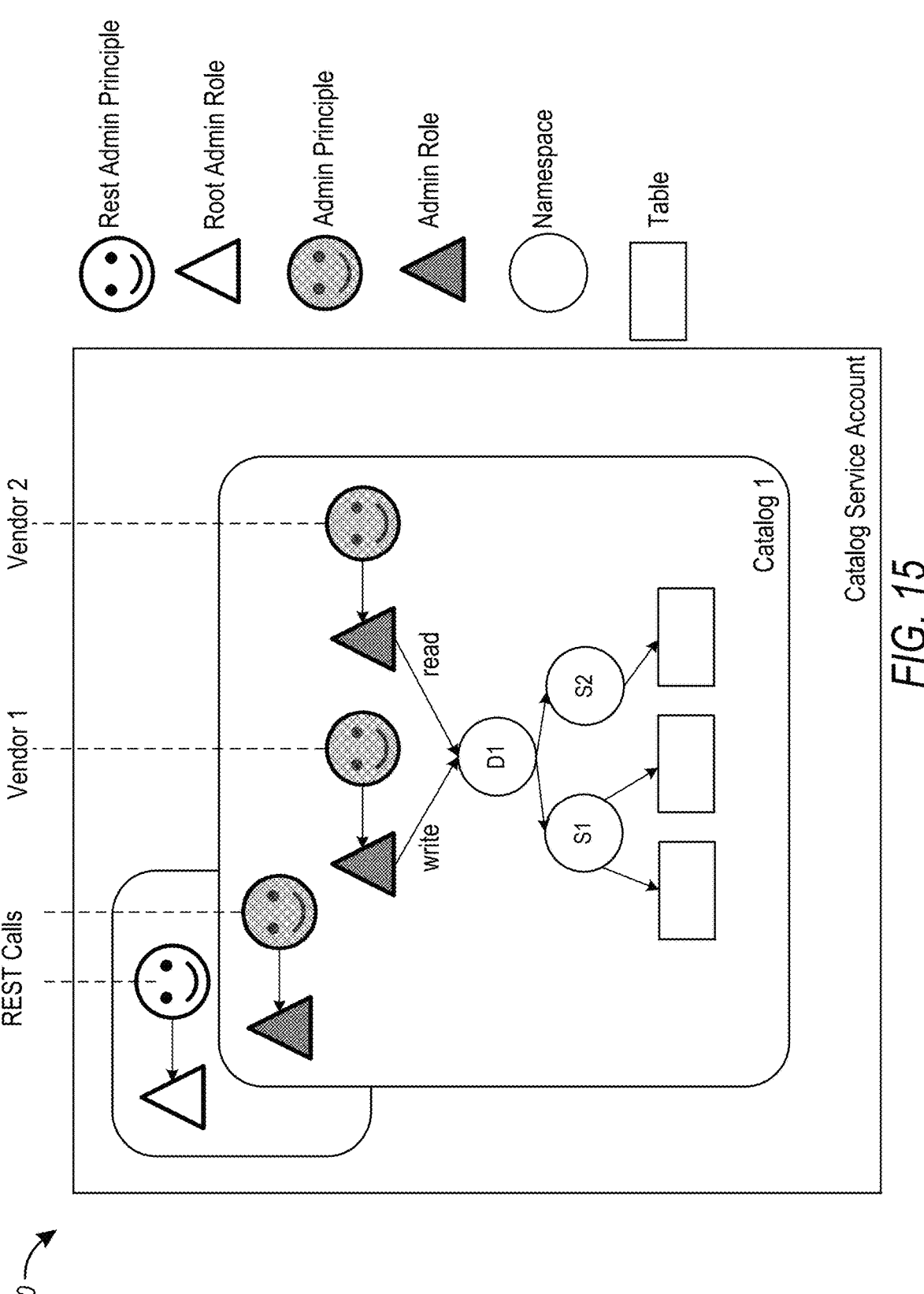
FIG. 15 is a diagram of a catalog service account including a catalog configured with different access privileges for different vendors, in accordance with some embodiments of the present disclosure.

FIG. 15 is a diagram of a catalog service account 1500 including a catalog configured with different access privileges for different vendors, in accordance with some embodiments of the present disclosure. In some aspects, NBDS 102, via a service catalog integration, is granted read/write access to a namespace D1 to replicate all Iceberg tables created under a database named "DB1" to that catalog under that namespace D1. Also, assume that Spark is granted read access to all tables in that namespace. The catalog admin can configure the above scenario by creating two new principals and two new roles, one with read and one with write access to the D1 namespace.

In the FIG. 15 model, Spark is granted only read access on D1. Granting write access can be an issue because the NBDS catalog service connector replicates under D1 Iceberg tables defined in the NBDS catalog; hence, it is only managed by the NBDS.

In some aspects, the disclosed privilege model (e.g., RBSM 514) can support several privileges targeting different types of securables. The following are some aspects that CM 128 can configure for the privilege model:

(a) There is no ownership privilege. The owner is the parent object in the object hierarchy. Where an object is created in the object hierarchy is a key aspect in determining which role will be able to access this object.

(b) Except for MANAGE on the account, roles in a catalog can only refer to securables defined in the same catalog.

(c) The MANAGE privilege is special. MANAGE on the account is automatically granted to the root admin role to create new catalogs, drop them, and reset their credentials. The MANAGE privilege on a catalog allows one to manage the roles and principals in that catalog and grant/revoke privileges to roles and grant/revoke roles to principals. MANAGE on account or catalog cannot be re-granted to any other role.

(d) With the exception of the MANAGE privilege, all other privileges cascade down the namespace hierarchy rooted by the catalog itself. For example, if a role is granted the NAMESPACE_CREATE on the catalog itself, the principal who is granted that role will be able to create any namespace at any level in the namespace hierarchy. By convention, the name of these privileges is composed of two words: the name of the privilege (see READ) and then the type of the entity being targeted (like TABLE). For example, TABLE_READ is a privilege that can be attached to the catalog and cascades to all tables in that catalog.

(e) Usage on roles can only be granted to principals in the same catalog. CM 128 may not support granting a role to another one.

(f) By default, when processing a REST request made on behalf of a catalog principal, we will activate all roles the principal has been granted in the catalog targeted by the request. Note that the authorization could scope down these roles to only a subset (we should eventually support this), but the assumption for now is that all roles will be activated.

(g) Securable are always resolved by IDs and not by name. If a role was granted some privileges on a securable and that securable is then dropped and later recreated with the same name but a different ID, then all previously granted privileges will not apply to the new securable since its ID is different.

(h) For convenience, a "manage" privilege can be used, which is a shortcut for creating, altering, and dropping.

Table 1 below shows a set of cascading privileges that CM 128 can support and use in the catalog service configuration. These privileges can apply to NAMESPACES, TABLES, or VIEWS but could also be set on the catalog, which defines the root namespace. The list shows the names of the objects, not their properties.

X are valid, so we have 15 cascading privileges plus the MANAGE privilege, which does not cascade.

In some aspects, CM 128 can use the following metadata model in connection with catalog service configuration. In some aspects, catalog service entities are modeled using the following uniform set of metadata attributes:

(a) Type: entity type, one of ACCOUNT, CATALOG, PRINCIPAL, ROLE, NAMESPACE, TABLE, and VIEW.

(b) ID: this is a unique identifier for the entity. This ID needs to be unique globally, i.e., within the entire account. Once assigned, entity IDs can never be reused.

(c) Name: external user-visible name (a string) for this entity.

(d) ParentId: ID of the entity which is the parent entity of that entity. It will be null only for the account entity. The combination (parentId, type, name) must be unique, allowing one to look up identities by name.

(e) createTimestamp: millisecond epoch time when the entity was first created.

(f) dropTimestamp: when the entity was dropped. It might be purged only at a later time. It will be null if the entity is still active.

(g) purge Timestamp: when purging that entity has started. It cannot be un-dropped after that point of time.

(h) lastUpdateTimestamp: timestamp when an entity was last updated.

(i) properties: optional map of name/value pairs configuring the entity. Generally, the configuration names will be defined based on the type of entity. The value could be a JSON document.

(j) internal_config: map of name/value pairs that don't correspond directly to Iceberg properties maps.

(k) Grants: given a type of permission, say "create table"; this will list the set of entity IDs that have been granted that permission on this entity. This permission can cascade to the entire subtree rooted by this entity. Note that grants in entities of type ROLE will target other entities like namespaces, tables, and views, while grants in these entities will target ROLE entities. When a privilege is granted to a role, we will update the grant property of that role but will also update the securable grant property to point back to the role. Principal entities will store the list of roles whose USAGE privilege was granted to them.

In an Iceberg catalog, these entities will be stored and managed uniformly, primarily organized in a tree-like struc-

TABLE 1

|  | Catalog | Principal | Principal_role_ Role | Catalog_ Role | Namespace | Table | View |
|---|---|---|---|---|---|---|---|
| Create | X | X | X | X | XX | XX | XX |
| Drop | X | X | X | X | XX | XX | XX |
| List | X | X | X | X | XX | | |
| Read_ Properties | | | | | XX | XX | XX |
| Write_Properties | | | | | XX | XX | XX |
| Read_Data | | | | | | XX | |
| Write_Data | | | | | | XX | |
| Assign_Grant | X | X | X | X | X | X | X |
| Revoke_Grant | X | X | X | X | X | X | X |

Note that only privileges indicated with "XX" will be published in APIs; the others are internal to the code. The above table describes all the valid combinations of privileges. It is easier to read when the object type is first used, and then the privilege name is used. For example, NAMESPACE_CREATE, TABLE_READ_ PROPERTIES, . . . . Only the above combinations with an ture using the above property "parentId" lineage. The account entity will be the root of the metadata tree. Only CATALOG entities can be directly attached to the ACCOUNT root node. CATALOG entities will root PRINCIPAL, ROLE, and top-level NAMESPACE entities. Under a NAMESPACE node, top-level or not, one can directly attach another NAMESPACE, a TABLE, or a VIEW node. TABLE, VIEW, ROLE, and PRINCIPAL entities are always leaf entities in this model.

Figure 16:
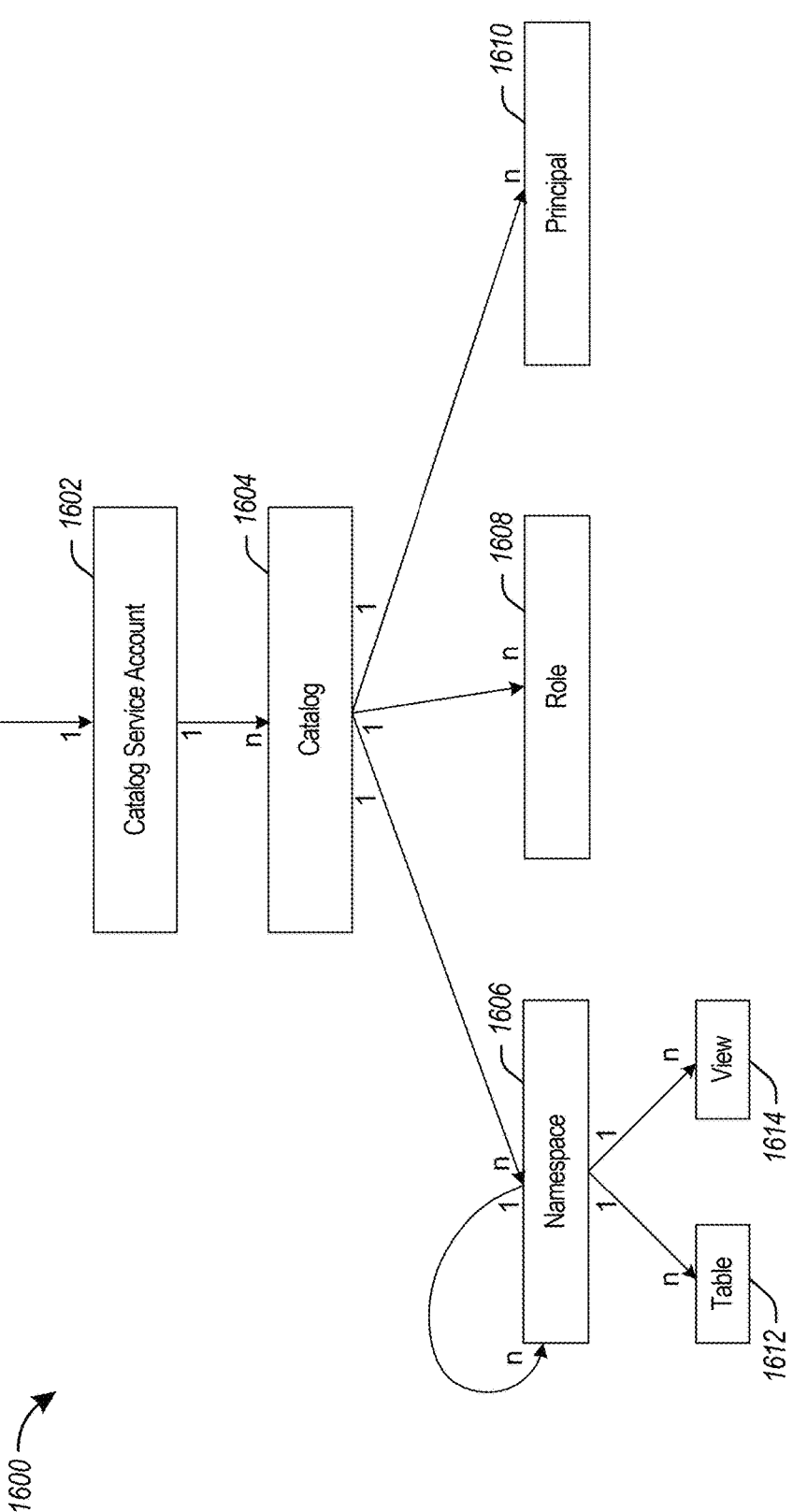
FIG. 16 is a diagram of an example hierarchy of catalog service account entities, in accordance with some embodiments of the present disclosure.

FIG. 16 is a diagram of an example hierarchy 1600 of catalog service account entities, in accordance with some embodiments of the present disclosure. Referring to FIG. 16, hierarch 1600 includes a catalog service account 1602 associated with a catalog 1604. The catalog 1604 is associated with at least one namespace 1606, role 1608, and principal 1610. The at least one namespace 1606 can include a table 1612 and a view 1614.

The entity tree in FIG. 16 is mainly used to resolve an entity given its name. Iceberg REST calls can be made in the context of only one single catalog, identified using the prefix field in the URI. A catalog service can also provide an extended set of REST APIs to manage catalogs, catalog roles, and principals. REST APIs can be used to grant privileges to roles and roles to principals.

In some aspects, entities in an Iceberg catalog are not only connected using the above entity tree-like hierarchy. Additionally, when a securable (e.g., a namespace, a table, or a view) is granted to a catalog role, an edge is created from that securable to the role that the securable has been granted to, and vice-versa.

In some aspects, when a role is granted to a principal, an edge is created from that role to the principal who has been granted this role and vice-versa. These grants relationships are shown in FIG. 17.

Figure 17:
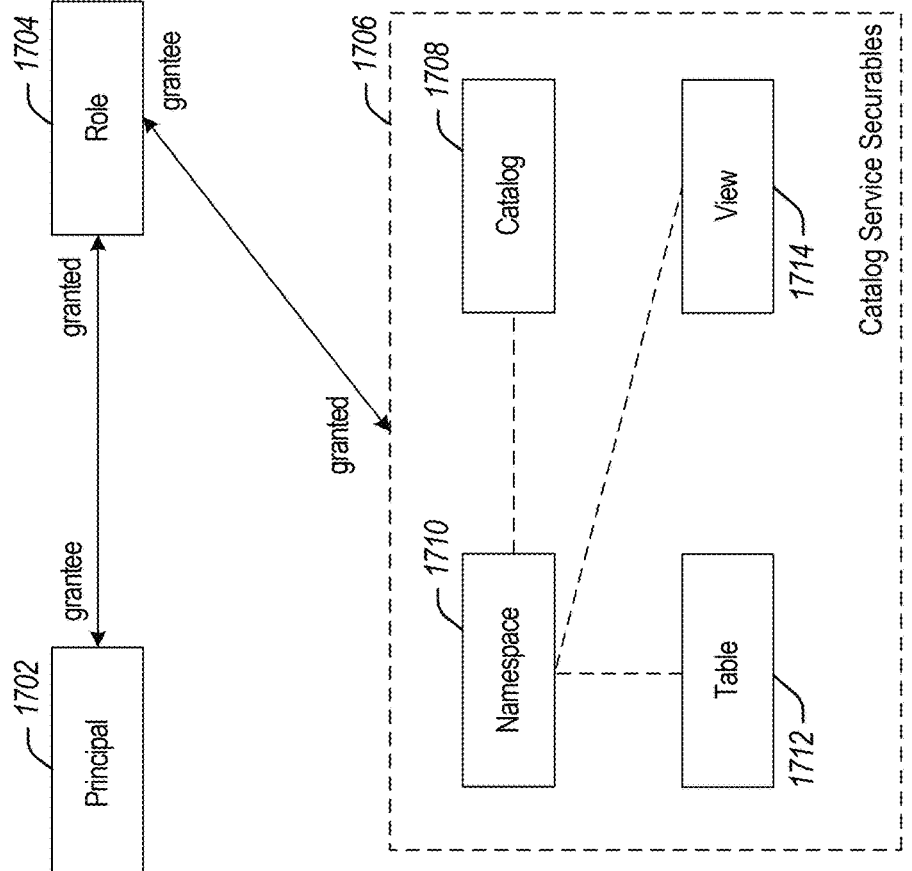
FIG. 17 is a diagram of grantor-grantee relations between securables and catalog service account entities, in accordance with some embodiments of the present disclosure.

FIG. 17 is a diagram 1700 of grantor-grantee relations between securables and catalog service account entities, in accordance with some embodiments of the present disclosure. Referring to FIG. 17, a principal 1702 can be granted a principal role 1704, which can be granted one or more securables 1706. The securable 1706 can be associated with a catalog 1708 and can include a namespace 1710, a table 1712, and a view 1714.

Table 2 lists the properties and operations associated with the various entities in an account.

TABLE 2

| Type | Parent Entity Type | Properties | Operations |
|---|---|---|---|
| Account | null | | |
| Catalog | Account | storage: default storage for that catalog (ext volume) | create <principal_name> [<activated>] drop <principal_name>: note that the admin principal cannot be dropped reset <principal_name> [<activated>]: rotate credentials, optionally |
| Principal | Catalog | activated: true if the principal has been activated. Default is false root namespace: if not null (the default), root | create <principal_name> [<activated>] drop <principal_name>: note that the admin principal cannot be dropped reset |

TABLE 2-continued

| Type | Parent Entity Type | Properties | Operations |
|---|---|---|---|
| | | namespace for that principal | <principal_name> [<activated>]: rotate credentials, optionally force activation grant |
| Role | Catalog | | grant <role_name> grant <privilege_name> on <securable>: not that generally a securable is identified by its type and optional name. |
| Namespace | Catalog | storage: default storage for that catalog (ext volume) | create/drop/alter [<nameSpace>] list [<nameSpace>] checkExistence [<nameSpace>] loadMetadata [<nameSpace>] - load namespace properties. What these are are not defined by the spec updateProperties [<nameSpace>] - update the namespace properties |
| Table | Namespace | location: location of that table, base location, not metadata metadata: metadata file | create/drop list load update register rename exists |
| View | Namespace | location version schema | create/drop list load rename exists replace |

In some aspects, CM 128 can use the following persistence layer configurations in connection with catalog service functionalities.

In some aspects, metadata entities can be managed using several database tables. The goal of the proposed schema is to avoid complex queries that would negatively impact the performance of the system. The CM 128 will have a few tables to manage all metadata associated with the entire Iceberg catalog account. These tables are as follows:

(a) Entities: This is the main table that stores all entities in the account. These entities are catalogs, roles, principals, namespaces, views, and tables. Note that when an entity is dropped, for example, a catalog, it can be marked in the entities table but wait before fully purging it and the underlying entity tree rooted by it. Purging can be done in the background.

(b) Entities_active: table tracking active entities (i.e., entities that have not been dropped), allowing us to efficiently find an active entity given its name, type, and parent ID. This table usually has fewer rows than the entities table because it stores only active entities. When an entity is dropped, the row associated with it will be removed immediately from this table but not from the entities table.

(c) Entities_dropped: This table tracks entities that have been dropped and will eventually have to be purged. Deleted entities are tracked for two purposes:

(c.1) eventually purge them. The length of time we wait before purging is configurable, but it defaults to 24 hours.

(c.2) to list all objects we could un-drop given their parent and name.

(d) Grant_records: table to track the grants made to entities in the catalog.

(e) Entities_change_tracking: table managing a set of cache stamps to track changes made to all entities in the catalog. This table is the foundation of the in-memory caching layer, enabling the implementation of a caching layer that stays consistent with the persistence layer.

The following subsections describe the schema of these tables, assuming Postgres is used as the underlying persistent store.

The ENTITIES table is the main table used by the persistence layer to manage all entities in all catalogs in the account. The only entity not stored by this table is the account since there is nothing to store for that entity. Hence, all entities are rooted in a catalog, and our model does not really support having anything outside. Hence, catalog_id is present in all these tables and part of the primary key so that CM 128 can operate on an entire catalog more quickly and efficiently. When the entity is the catalog itself, the account_id is used instead. For a single tenant model (one account only), the account_id is 0. Hence, efficient access mandates the use of the catalog_id in all these queries. By convention, catalog_id will be 0 for catalog entities The following Table 3 gives the set of columns for the ENTITIES table.

TABLE 3

| Name | Type | Con-straint | Comment |
|---|---|---|---|
| catalog_id | BIGINT | PK | We only need this to validate that objects which are connected (either from the entity hierarchy or by grand records) belong to the same catalog. 0 for catalog entities, with 0 used as NA. |
| type | INTEGER | Not Null | The type of this entity. One of CATALOG (2), PRINCIPAL (3), ROLE (4), NAMESPACE (5), and TABLE_LIKE (6). Note ACCOUNT is not valid here because we don't need to look it up since its id is always 0. |
| subType | INTEGER | Nullable | For entity types that have subtypes like TABLE_LIKE, this indicates the applicable subtype. One of TABLE (2) or VIEW (3) |
| id | BIGSERIAL | PK | This is the primary key for this table, a unique |

| Name | Type | Con-straint | Comment |
|---|---|---|---|
| parent_id | parent_id | Not Null | BIGINT data type monotonically increasing Id of the parent for that entity. By convention, the id of the account is 0 |
| name | TEXT | Not Null | Name of the entity. Will be mostly used to resolve namespaces, tables and views |
| create_time-stamp | BIGINT | Not Null | When the entity was created, a millisecond epoch time. Mostly used for debugging. |
| drop_time-stamp | BIGINT | Nullable | When the entity was dropped. Might be purged only at a later time, so also used as a tombstone. Will be null if the entity is still active and visible. |
| purge_time-stamp | BIGINT | Nullable | When an entity has been dropped, at a later time it will be purged. When the purge process has started, it cannot be un-dropped anymore. Before this, un-dropping the entity is possible. We will extend the Iceberg REST API to support un-dropping entities. Purging from the catalog will start 24 hours later. |
| last_update_time-stamp | BIGINT | Nullable | Timestamp after creation when the entity was last updated as a result of a direct Iceberg REST call. |
| properties | JSONB | Nullable | An extensible map of name/value pairs configuring the entity. Generally the configuration names will be defined based on the type of entity. The value itself could be a JSON document. |
| internal_properties | JSONB | Nullable | Map of name/value pairs that don't correspond directly to Iceberg properties maps. Allowable properties will be defined/enforced by specific REST Catalog implementations; not intended for processing engines to directly manipulate |

TABLE 3-continued

| Name | Type | Con-straint | Comment |
|---|---|---|---|
| entity_version | INTEGER | Not Null | Use for cache invalidation (see later) by tracking changes made directly to this entity. Every time this entity is updated, we will increment the corresponding entity_version column. The initial version is 1. |
| grant_records_ver-sion | INTEGER | Not Null | Use for cache invalidation (see later) by tracking changes made indirectly to this entity when grant records are modified. Changed tracked here depend on the type of the entity: If the entity is a principal, we will increment the grant_records_version value each time a role is granted or revoked from the principal Else, when a privilege on this (securable) entity is granted or revoked, we will increment the grant_records_version value. |

As mentioned above, ID can be the primary key of that table, allowing for quick fetching of all attributes of an entity: PRIMARY KEY (catalog_id, id).

CM 128 may need to efficiently find the ID of an active entity given its parent_id, its type, and its name. These active entities can be tracked with the following Table 4 (Entities_Active table):

TABLE 4

| Name | Type | Constraint | Comment |
|---|---|---|---|
| catalog_id | BIGINT | PK | Catalog id for efficient access if needs be. Will be 0 for a catalog entity. |
| parent_id | BIGINT | PK | Id of the parent for that entity. By convention, the id of the account is 0 |
| type | INTEGER | PK | The type of this entity. One of CATALOG (2), PRINCIPAL (3), ROLE (4), NAMESPACE (5), and TABLE_LIKE (6). Note ACCOUNT is not valid here because |

TABLE 4-continued

| Name | Type | Constraint | Comment |
|---|---|---|---|
| | | | we don't need to look it up since its id is always 0. |
| subType | INTEGER | Not Null | Sub type for this entity. For table-like entities, it can be view or table. Notice that we will represent null with a special 0 value. |
| name | TEXT | PK | Name of the entity. |
| id | BIGINT | Not Null | The id of the entity in the ENTITIES table. The entity MUST exist in that ENTITIES table (the reverse might not be true). |

For example, to lookup a " " entity named "TABLE1", CM 128 can lookup (0, "CATALOG1", 2), where 2 is the ordinal associated with CATALOG entities, 0 represents the ID of the account which is always 0. Or lookup (123, "N1", 5) to lookup the top-level namespace "N1" whose parent catalog is the catalog ID 123.

This table efficiently lists all children of an entity in the entity tree by filtering on the parent_id and type columns, which are the first two columns in the PK index. It is also used at purge time to traverse all entities rooted by the entity that was dropped and which must be purged.

When dropping a tree of entities (let's say drop catalog), only the row corresponding to the entity associated with the catalog that was dropped will be removed from this table. Any entity below the catalog that has not been directly dropped will not be removed from this table. Hence, this table is intended to be traversed top-bottom.

Primary key index can be configured as PRIMARY KEY (catalog_id, id).

The ENTITIES_DROPPED table (e.g., Table 5) tracks any entity that was dropped but has not yet been fully purged from metadata. It allows users to un-drop a dropped entity assuming that purging of this entity has not started. It also allows the background purge process to find what needs to be purged next, using the index on the drop_timestamp.

The purge process will also leverage the entities_active table to traverse the entire subtree rooted by an entity that has been dropped, hence making sure that the purge process cascades.

TABLE 5

| Name | Type | Constraint | Comment |
|---|---|---|---|
| catalog_id | BIGINT | PK | Catalog id for efficient access if needs be. Will be 0 for a catalog entity. |
| parent_id | BIGINT | PK | Id of the parent for that entity. By convention, the id of the account is 0 |

TABLE 5-continued

| Name | Type | Constraint | Comment |
|---|---|---|---|
| name | TEXT | PK | Name of the entity. |
| type | INTEGER | PK | The type of this entity. One of CATALOG (2), PRINCIPAL (3), ROLE (4), NAMESPACE (5), TABLE_LIKE (6). Note ACCOUNT is not valid here because we don't need to look it up since its id is always 0. |
| subType | INTEGER | PK | The subType for table like entities, either VIEW or TABLE. For the undrop model, tables and views are different so the sub-type is part of the key. |
| drop_timestamp | BIGINT | PK | When the entity was dropped. |
| to_purge_timestamp | BIGINT | Not Null | When the entity should be purged |
| id | BIGINT | Not Null | The id of the entity in the ENTITIES table. The entity MUST exist in that ENTITIES table. |

Primary key index. CM 128 can allow to find all entities dropped in a catalog as well as quickly finding all entities under a given parent_id and given their name/type that were last dropped. PRIMARY KEY (catalog_id, parent_id, name, type, subType, drop_timestamp) can be used for this configuration.

The ENTITIES_DROPPED_TO_PURGE_IDX index will be used to order dropped entities by their to_purge_timestamp, allowing the background purge process to purge these entities when the time comes.

Index ENTITIES_DROPPED_TO_PURGE_IDX (to_purge_timestamp, catalog_id, id) can be used. The catalog_id and id are added to avoid a table lookup.

The GRANT_RECORDS table (e.g., Table 6) tracks all privileges granted by the system. This table records grants made to roles and roles granted to principals. The schema of GRANT_RECORDS table is as follows:

TABLE 6

| Name | Type | Constraint | Comment |
|---|---|---|---|
| catalog_id | BIGINT | PK | Id of the catalog, just to have that information in case we need it. 0 if the securable_type is a CATALOG. |

TABLE 6-continued

| Name | Type | Constraint | Comment |
|---|---|---|---|
| securable_id | BIGINT | PK | The id of the securable which has been granted to the grantee. Always 0 for an ACCOUNT. |
| grantee_id | BIGINT | PK | The id of the grantee, either the id of a principal when the securable is a role or the id of a role for anything else. |
| privilege | INTEGER | PK | The privilege which has been granted. One of MANAGE(1), CREATE(2), DROP(3), USE(4), DESCRIBE(5), READ_VIEW(6), WRITE_VIEW(7), READ_TABLE(8), WRITE_TABLE(9) |

Primary key index. When a securable is authorized for a particular privilege, we will have to efficiently retrieve all privileges granted to that securable and post-filter on the subset of roles granted to the principal making the request. Hence, an index on the securable ID may be needed. The following format can be used: PRIMARY KEY (catalog_id, securable_id, grantee_id, privilege).

For authorization purposes, CM 128 may need to load efficiently all roles granted to a principal and show the catalog admin all grants made to a role. For these two use cases, a second index on the grantee_id column can be created, such as Index GRANT_RECORDS_BY_GRANT-EE_IDX (grantee_catalog_id, grantee_id, securable_catalog_id, securable_id, privilege) (the last three columns are added to avoid any table lookup).

The schema of the ENTITIES_CHANGE_TRACKING table (e.g., Table 7) is simple; it has only three columns, which are replicating the same three columns from the ENTITIES table. The table can be considered as a vertical replica of the table ENTITIES for these three columns. In some aspects, CM 128 may only store the value of entity_version and grant_records_version in that vertical slice and have them in both tables.

TABLE 7

| Name | Type | Con-straint | Comment |
|---|---|---|---|
| catalog_id | BIGINT | PK | Catalog id for efficient access if needs be. Will be 0 for a catalog entity. |
| id | BIGINT | Not Null | Id of the entity, every entity will be represented in this table. Basically, this table is one to one with the ENTITIES table. |

TABLE 7-continued

| Name | Type | Con-straint | Comment |
|---|---|---|---|
| entity_version | INTEGER | Not Null | Use for cache invalidation (see later) by tracking changes made directly to this entity. Every time this entity is updated, we will increment the corresponding entity_version column. The initial version is 1. |
| grant_records_version | INTEGER | Not Null | Use for cache invalidation (see later) by tracking changes made indirectly to this entity when grant records are modified. Changed tracked here depend on the type of the entity: If the entity is a principal, we will increment the grant_records_version value each time a role is granted or revoked from the principal Else, when a privilege on this (securable) entity is granted or revoked, we will increment the grant_records_version value. |

The above table can be configured to enable efficient in-memory caching of entities loaded from the ENTITIES table along with all grant records on these entities. The in-memory cache can be consistent with the set of entities that is persisted.

The PRINCIPAL_SECRETS table (e.g., Table 8) is used to store the secrets and associated client_id generated on behalf of a principal. It can be used during the OAuth flow. Each time a new principal is created, a new row is added to the table to store the secrets for the client_id associated with that principal.

TABLE 8

| Name | Type | Constraint | Comment |
|---|---|---|---|
| client_id | String | PK | Client id, unique OAuth identifier for the principal. The client id is one of the property of the principal |
| principal_id | BIGINT | Not Null | Id of the principal entity. |
| main_secret | String | Not Null | First and main secret for this principal |
| secondary_secret | String | Not Null | Secondary secrets. When secrets are rotated, the |

TABLE 8-continued

| Name | Type | Constraint | Comment |
|---|---|---|---|
| | | | main_secret will become the secondary_secret and a new random secret will be generated for the main secrets. |

In memory caching. CM 128 can use in-memory caching to avoid taxing the underlying persistent storage system and also reduce the latency of the REST request served. This section explains how the cache will work. In some aspects, caching will be implemented inside the catalog service app code and not on the compute service manager side.

Figure 18:
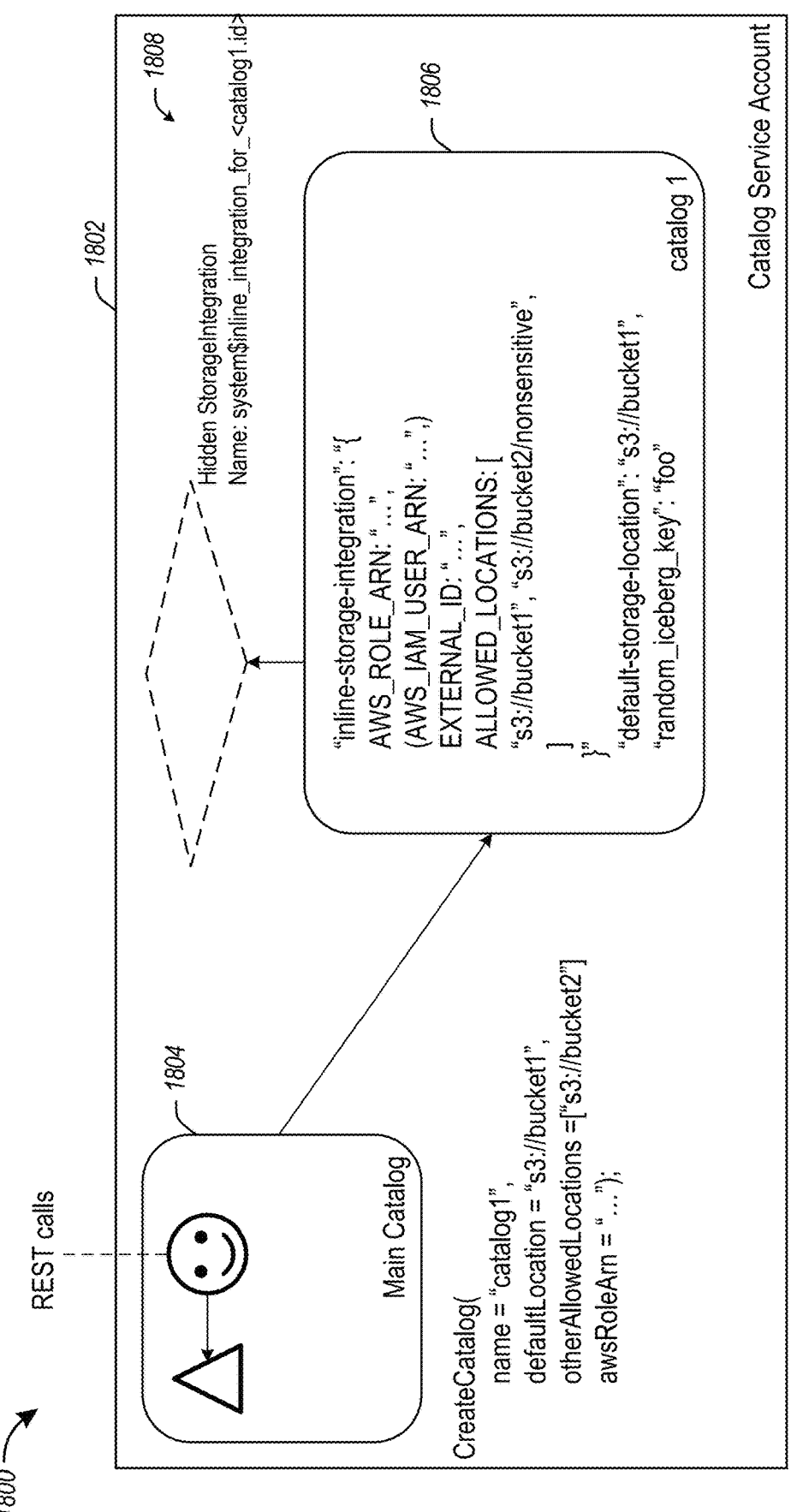
FIG. 18 is a diagram of storage credential vending for a catalog service account, in accordance with some embodiments of the present disclosure.

FIG. 18 is a diagram 1800 of storage credential vending for a catalog service account, in accordance with some embodiments of the present disclosure. Referring to FIG. 18, CM 128 can configure a catalog service account 1802 with a main catalog 1804. The main catalog 1804 can configure a second catalog 1806 with storage credentials 1808. The storage credentials 1808 represent storage credential vending and can be used by the second catalog 1806 to access secondary storage locations. In this regard, storage credentials 1808 can identify the external storage location and can include storage location ID, allowed storage locations, and access credentials.

CM 128 can decouple the following two elements related to storage configuration:

(a) Storage credentials with constraints. This can be represented by storage integration and may not be exposed as a catalog service entity. The term "constraints" in the form of ALLOWED_STORAGE_LOCATIONS is descriptive of possible locations, not prescriptive. For example, it is allowed to set ALLOWED_STORAGE_LOCATIONS= ["*"] to allow no constraints at all.

(b) Physical locations of files in tables or "default" physical locations under particular catalogs or namespaces. Catalogs and namespaces can hold an Iceberg property called default-base-location.

(c) For catalogs, this will appear as the "warehouse" property in getConfig.

(d) For namespaces, this will appear as a "default-base-location" property in the general namespace properties map. Tables and views can include a top-level metadata field called location that is serialized into the metadata JSON file.

(e) A field called secondary-locations can be introduced to table and view Iceberg properties, which will list all the historical base locations where the table or view may hold data or metadata files.

Figure 19:
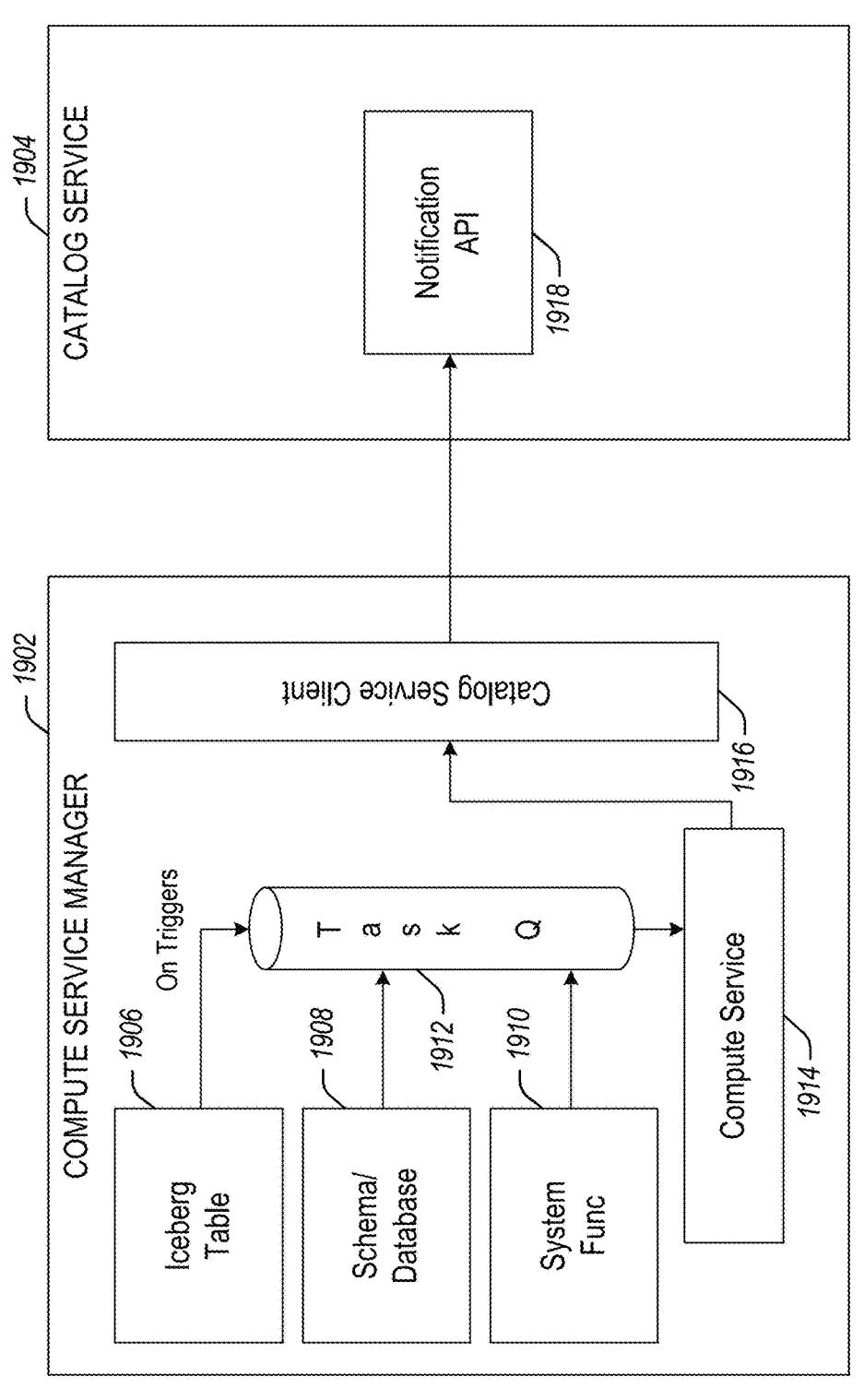
FIG. 19 is a diagram of compute service manager and catalog service integration, in accordance with some embodiments of the present disclosure.

FIG. 19 is a diagram 1900 of compute service manager and catalog service integration, in accordance with some embodiments of the present disclosure. Referring to FIG. 19, computer service manager 1902 can be the same as compute service manager 108 and can include an Iceberg table 1906, a schema/database 1908, system function 1910, task queue 1912, compute service 1914, and catalog service client 1916. The catalog service client 1916 is in communication with catalog service 1904 with a notification API 1918.

The Apache Iceberg spec does not have support for representing tables that originate from other catalogs (like NBDS). In this regard, CM 128 can use a concept of "external catalogs" to represent data originating from outside catalog sources. The tables within the external catalog are read only for engines like Spark and are continuously synchronized via the notification mechanism using thye notification API 1918. The proposal details a REST based notification API 1918 that could be added to the Iceberg specification for allowing synchronization of tables that belong to the external catalogs.

At a high level, the architecture of FIG. 19 can be configured with the following components:

(a) Specification for the REST API in the catalog service where the notifications can be sent.

(b) Notification API 1918 implementation in the catalog service.

(c) Catalog service client 1916 for the catalog service that understands the expanded REST API set.

(d) DDL changes in the compute service manager in the NBDS to:

(d.1) Represent the target catalog service to send notifications.

(d.2) Specify the scope of entities (table/schema/database) that need to be mirrored in the catalog service.

(d.3) Propagation of the parameter (ExecAlterIcebergPropertiesHelper)

(e) Define the triggers (when to send the notification) on the NBDS entities (table/schema/database) which would lead to notifications.

(f) Lifecycle management for the catalog sync integration which implies that users may not be able to drop their catalog integration if it has been set a target on some tables.

(g) Asynchronous execution framework for sending notifications to catalog service (IcebergCatalogIntegrationSyncTask, IcebergCatalogIntegrationSyncTaskFactory).

(h) A system function 1910 that could be invoked by the compute service manager or NBDS customers to send notifications (SendNotificationsToCatalogById for compute service, SendNotificationsToCatalog for customer use).

(h.1) The catalog service client 1916 allows sending notifications per table, and the system function allows sending notifications at different granularities (e.g., database, schema, or table).

(h.2) Allows sending notifications for a given catalog only.

The operations on Iceberg tables are done at table level granularity (including setting the properties or parameters), while in the NBDS, users are allowed to set properties at schema or database level (represented as a namespace in Iceberg). This requires propagating these properties from higher-level entities (schema/database/namespace) to each table in the NBDS. The user could specify the external catalog to which the table could be synced via the CATA-LOG_SYNC property that needs to be set at the database/schema/table level, which is then propagated to all the tables under that hierarchy.

With notification via the notification API, CM 128 can achieve a bidirectional synchronization between catalogs, allowing them to represent the tables owned by another catalog under an "external" catalog. Specifically for the NBDS to catalog service notifications, a message queue-based model can be used where the catalog service could subscribe to changes on NBDS-managed tables, and the NBDS invokes the notification endpoint on the catalog service when any table updates happen. This is illustrated in FIG. 20.

Figure 20:
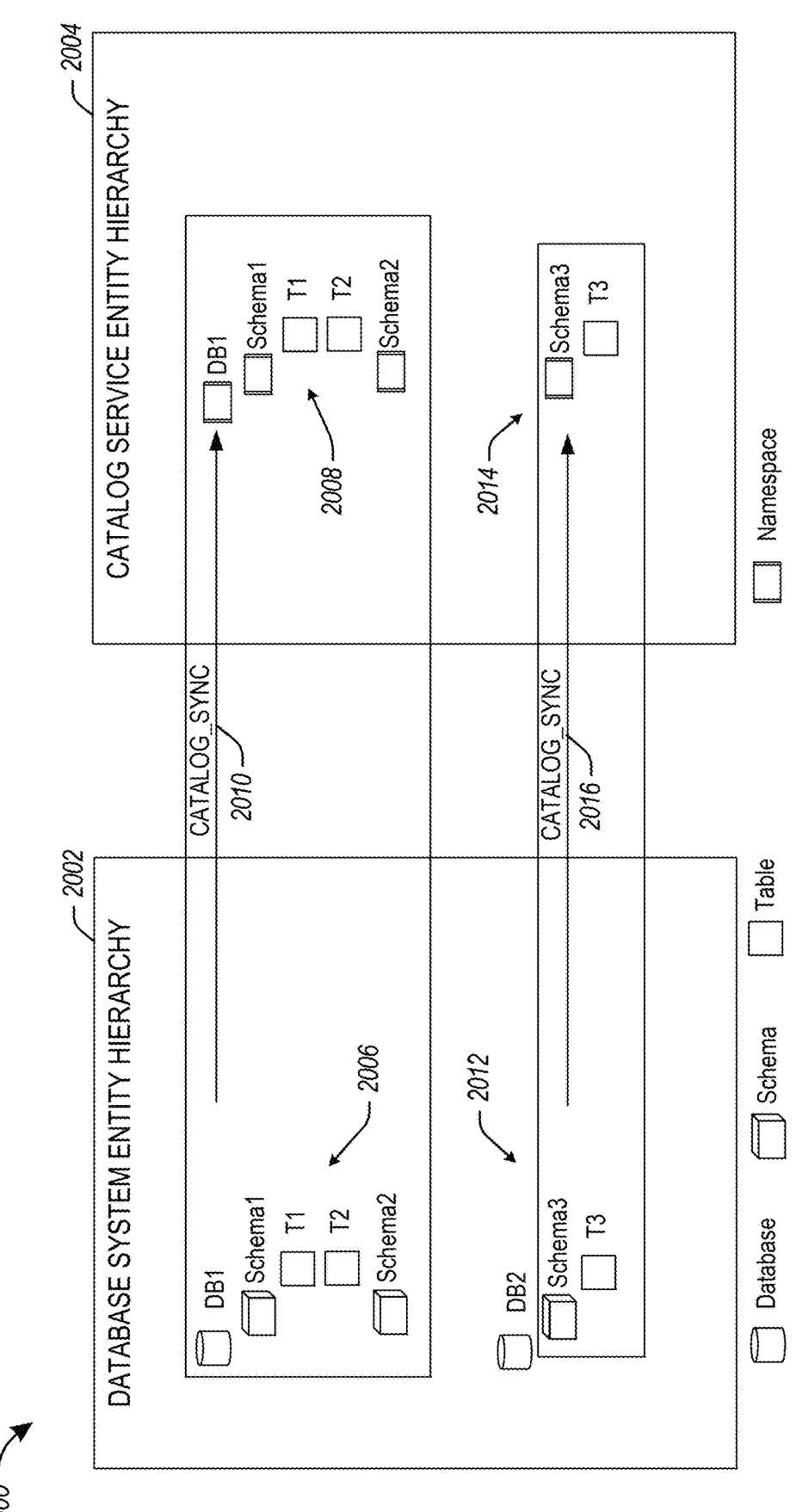
FIG. 20 is a diagram of catalog synchronization between a compute service manager and a catalog service, in accordance with some embodiments of the present disclosure.

FIG. 20 is a diagram of catalog synchronization between a compute service manager and a catalog service, in accordance with some embodiments of the present disclosure. Referring to FIG. 20, the database system entity hierarchy 2002 can include table-schema-database hierarchies 2006 and 2012. In some aspects, the database system entity hierarchy 2002 can use the notification API to push table updates into a catalog (e.g., an Iceberg catalog) of a catalog service. As illustrated in FIG. 20, the database system entity hierarchy 2002 can use the notification API to push table updates from hierarchy 2006 (e.g., updates to tables T1 or T2) during synchronization 2010 to a corresponding hierarchy 2008 at the catalog service entity hierarchy 2004. Similarly, the database system entity hierarchy 2002 can use the notification API to push table updates from hierarchy 2012 (e.g., updates to table T3) during synchronization 2016 to a corresponding hierarchy 2014 at the catalog service entity hierarchy 2004.

In some aspects, the synchronization target is the catalog integration that can be notified about updates to the table or namespaces. This would be implemented as a table lineage parameter that takes the catalog name as the value. In some aspects, only managed tables could have a catalog sync target.

In some aspects, upon communicating an update from an NBDS-managed table (in an NBDS-managed catalog) to a catalog service, a corresponding read-only replica of the table is created in an external catalog at the catalog service, which can include generating the corresponding namespaces associated with the NBDS-managed table and then posting the corresponding updates to the read-only replica (or a representation) of the table.

The read-only table representation in the catalog service can be referred to as an "external catalog," which cannot be written to via Iceberg APIs. Any change in a data object of the NBDS-managed catalog causes an automatic communication of the update via a notification API so that the corresponding data object in the read-only external catalog at the catalog service is also updated.

FIG. 21 is a flow diagram illustrating the operations of a database system in performing a method 2100 for configuring a catalog service, in accordance with some embodiments of the present disclosure. Method 2100 may be embodied in computer-readable instructions for execution by one or more hardware components (e.g., one or more processors) such that the operations of method 2100 may be performed by components of NBDS 102, such as components of the compute service manager 108 (e.g., the CM 128) and/or the execution platform 110 (which components may be implemented as machine 2200 of FIG. 22). Accordingly, method 2100 is described below, by way of example with reference to it. However, method 2100 may be deployed on various other hardware configurations and is not intended to be limited to deployment within the NBDS 102.

At operation 2102 and as described in connection with FIG. 8, CM 128 detects at a catalog service account, a user request to access a data object. The user request includes identification information of the user and a principal role associated with the user.

At operation 2104, CM 128 retrieves one or more catalog roles from a first catalog of the catalog service account. The one or more catalog roles correspond to the principal role.

At operation 2106, CM 128 determines a set of hierarchical data objects based on the user request, the set of hierarchical data objects comprising the data object.

At operation 2108, CM 128 performs a determination of whether access privileges of the set of hierarchical data objects and access privileges of the one or more catalog roles allow access to the data object.

At operation 2110, CM 128 grants access to the data object based on the determination.

Figure 22:
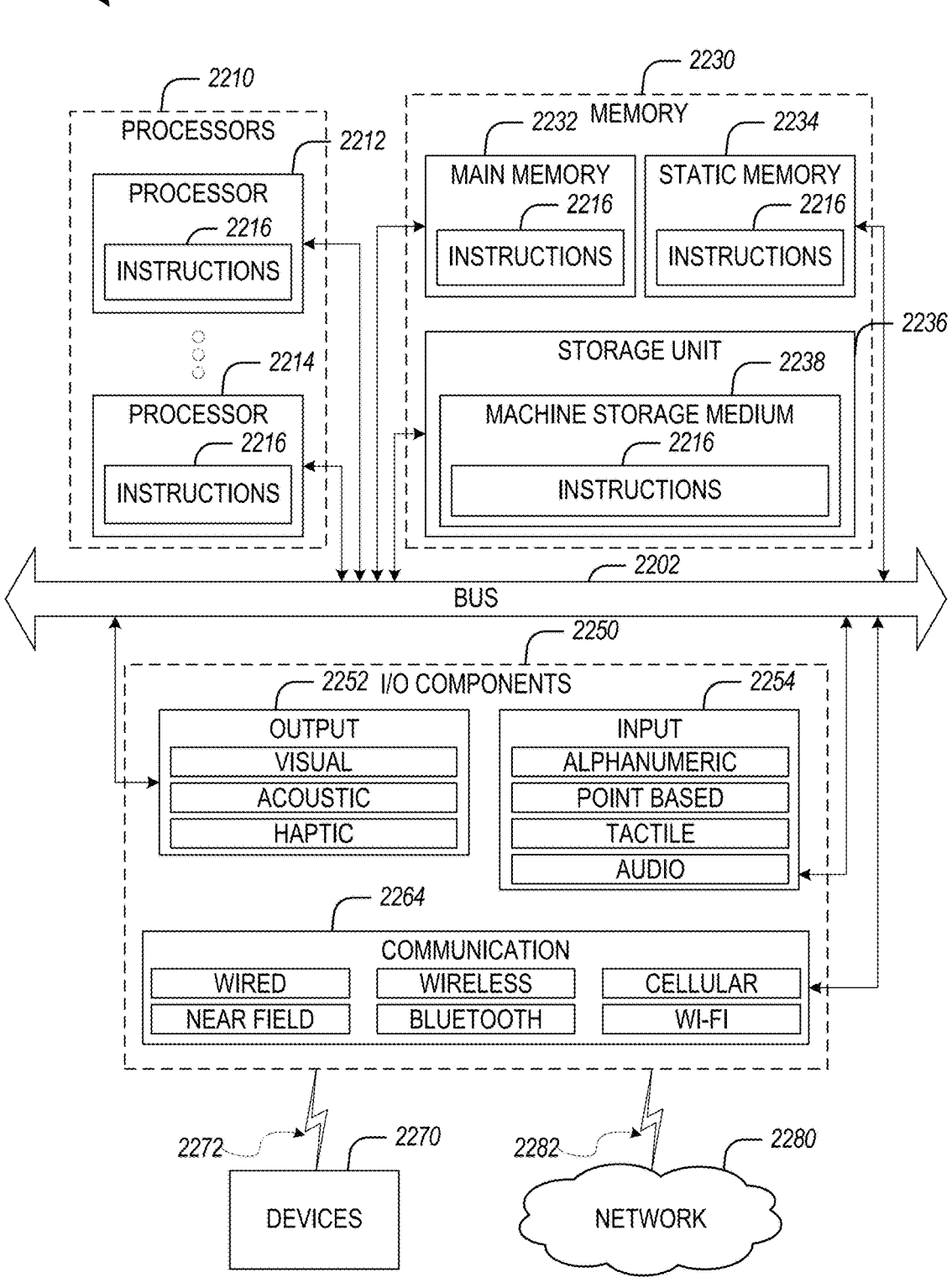
FIG. 22 illustrates a diagrammatic representation of a machine in the form of a computer system within which a set of instructions may be executed for causing the machine to perform any one or more of the methodologies discussed herein, in accordance with some embodiments of the present disclosure.

FIG. 22 illustrates a diagrammatic representation of machine 2200 in the form of a computer system within which a set of instructions may be executed to cause machine 2200 to perform any one or more of the methodologies discussed herein, according to an example embodiment. Specifically, FIG. 22 shows a diagrammatic representation of machine 2200 in the example form of a computer system, within which instructions 2216 (e.g., software, a program, an application, an applet, an app, or other executable code) for causing the machine 2200 to perform any one or more of the methodologies discussed herein may be executed. For example, instructions 2216 may cause machine 2200 to execute any one or more operations of method 2100 (or any other technique discussed herein, for example, in connection with FIG. 4-FIG. 20). As another example, instructions 2216 may cause machine 2200 to implement one or more portions of the functionalities discussed herein. In this way, instructions 2216 may transform a general, non-programmed machine into a particular machine 2200 (e.g., the compute service manager 108 or a node in the execution platform 110) that is specially configured to carry out any one of the described and illustrated functions in the manner described herein. In yet another embodiment, instructions 2216 may configure the compute service manager 108 and/or a node in the execution platform 110 to carry out any one of the described and illustrated functions in the manner described herein.

In alternative embodiments, the machine 2200 operates as a standalone device or may be coupled (e.g., networked) to other machines. In a networked deployment, machine 2200 may operate in the capacity of a server machine or a client machine in a server-client network environment or as a peer machine in a peer-to-peer (or distributed) network environment. The machine 2200 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 2216, sequentially or otherwise, that specify actions to be taken by the machine 2200. Further, while only a single machine 2200 is illustrated, the term "machine" shall also be taken to include a collection of machines 2200 that individually or jointly execute the instructions 2216 to perform any one or more of the methodologies discussed herein.

Machine 2200 includes processors 2210, memory 2230, and input/output (I/O) components 2250 configured to communicate with each other, such as via a bus 2202. In some example embodiments, the processors 2210 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2212 and a processor 2214 that may execute the instructions 2216. The term "processor" is intended to include multi-core processors 2210 that may comprise two or more independent processors (sometimes referred to as "cores") that may execute instructions 2216 contemporaneously. Although FIG. 22 shows multiple processors 2210, machine 2200 may include a single processor with a single core, a single processor with multiple cores (e.g., a multi-core processor), multiple processors with a single core, multiple processors with multiple cores, or any combination thereof.

The memory 2230 may include a main memory 2232, a static memory 2234, and a storage unit 2236, all accessible to the processors 2210, such as via the bus 2202. The main memory 2232, the static memory 2234, and the storage unit 2236 store the instructions 2216, embodying any one or more of the methodologies or functions described herein. The instructions 2216 may also reside, wholly or partially, within the main memory 2232, within the static memory 2234, within machine storage medium 2238 of the storage unit 2236, within at least one of the processors 2210 (e.g., within the processor's cache memory), or any suitable combination thereof, during execution thereof by the machine 2200.

The I/O components 2250 include components to receive input, provide output, produce output, transmit information, exchange information, capture measurements, and so on. The specific I/O components 2250 that are included in a particular machine 2200 will depend on the type of machine. For example, portable machines such as mobile phones will likely include a touch input device or other such input mechanisms, while a headless server machine will likely not include such a touch input device. It will be appreciated that the I/O components 2250 may include many other components that are not shown in FIG. 22. The I/O components 2250 are grouped according to functionality merely to simplify the following discussion. The grouping is in no way limiting. In various example embodiments, the I/O components 2250 may include output components 2252 and input components 2254. The output components 2252 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 2254 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 2250 may include communication components 2264 operable to couple the machine 2200 to a network 2280 or devices 2270 via a coupling 2282 and a coupling 2272, respectively. For example, the communication components 2264 may include a network interface component or another suitable device to interface with the network 2280. In further examples, communication components 2264 may include wired communication components, wireless communication components, cellular communication components, and other communication components to provide communication via other modalities. The device 2270 may be another machine or any of a wide variety of peripheral devices (e.g., a peripheral device coupled via a universal serial bus (USB)). For example, as noted above, machine 2200 may correspond to any one of the compute service manager 108 or the execution platform 110, and device 2270 may include the client device 114 or any other computing device described herein as being in communication with the NBDS 102 or the cloud storage platform 104.

The various memories (e.g., 2230, 2232, 2234, and/or memory of the processor(s) 2210 and/or the storage unit 2236) may store one or more sets of instructions 2216 and data structures (e.g., software) embodying or utilized by any one or more of the methodologies or functions described herein. These instructions 2216, when executed by the processor(s) 2210, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and/or device-storage media include non-volatile memory, including by way of example, semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2280 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 2280 or a portion of network 2280 may include a wireless or cellular network, and the coupling 2282 may be a Code Division Multiple Access (CDMA) connection, a Global System for Mobile communications (GSM) connection, or another cellular or wireless coupling. In this example, the coupling 2282 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2216 may be transmitted or received over network 2280 using a transmission medium via a network interface device (e.g., a network interface component included in the communication components 2264) and utilizing any one of several well-known transfer protocols (e.g., hypertext transfer protocol (HTTP)). Similarly, instructions 2216 may be transmitted or received using a transmission medium via coupling 2272 (e.g., a peer-to-peer coupling) to device 2270. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2216 for execution by the machine 2200 and includes digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments, the processors may be distributed across several locations.

Described implementations of the subject matter can include one or more features, alone or in combination, as illustrated below by way of examples.

Example 1 is a system comprising: at least one hardware processor; and at least one memory storing instructions that cause the at least one hardware processor to perform operations comprising: detecting at a catalog service account, a user request to access a data object, the user request including identification information of the user and a principal role associated with the user; retrieving one or more catalog roles from a first catalog of the catalog service account, the one or more catalog roles corresponding to the principal role; determining a set of hierarchical data objects based on the user request, the set of hierarchical data objects comprising the data object; performing a determination of whether access privileges of the set of hierarchical data objects and access privileges of the one or more catalog roles allow access to the data object; and granting access to the data object based on the determination.

In Example 2, the subject matter of Example 1 includes, the operations further comprising: retrieving the access privileges of the set of hierarchical data objects and the access privileges of the one or more catalog roles from a role-based security model of the catalog service account.

In Example 3, the subject matter of Example 2 includes, the operations further comprising: detecting the set of hierarchical data objects comprises a plurality of nested namespaces; and determining the access privileges of the set of hierarchical data objects based on access privileges for each namespace of the plurality of nested namespaces.

In Example 4, the subject matter of Examples 2-3 includes, the operations further comprising: retrieving a first set of access privileges from the role-based security model, the first set of access privileges associated with the first catalog, and including the access privileges of the one or more catalog roles; retrieving a second set of access privileges from the role-based security model, the second set of access privileges associated with a second catalog of the catalog service account; and configuring access to the first catalog and the second catalog based on the first set of access privileges and the second set of access privileges.

In Example 5, the subject matter of Examples 1-4 includes, the operations further comprising: retrieving a plurality of principal identities associated with the catalog service account; and selecting a principal identity of the plurality of principal identities based on the identification information of the user.

In Example 6, the subject matter of Example 5 includes, the operations further comprising: retrieving a plurality of catalog roles configured in the first catalog; and selecting the one or more catalog roles from the plurality of catalog roles based on the principal role.

In Example 7, the subject matter of Examples 1-6 includes, the operations further comprising: determining the set of hierarchical data objects based on the one or more catalog roles, the set of hierarchical data objects comprising at least one namespace, at least one table, and at least one table view.

In Example 8, the subject matter of Examples 1-7 includes, the operations further comprising: detecting a synchronization request received at the catalog service account, the synchronization request associated with a second catalog that is external to the catalog service account.

In Example 9, the subject matter of Example 8 includes, the operations further comprising: generating responsive to the synchronization request, an external catalog representation of the second catalog, the external catalog representation configured as a read-only catalog in the catalog service account.

In Example 10, the subject matter of Example 9 includes, the operations further comprising: receiving via an application programming interface (API), a notification of an update posted to the second catalog; and updating the external catalog representation based on the update.

Example 11 is a method comprising: detecting at a catalog service account by at least one hardware processor, a user request to access a data object, the user request including identification information of the user and a principal role associated with the user; retrieving one or more catalog roles from a first catalog of the catalog service account, the one or more catalog roles corresponding to the principal role; determining a set of hierarchical data objects based on the user request, the set of hierarchical data objects comprising the data object; performing a determination of whether access privileges of the set of hierarchical data objects and access privileges of the one or more catalog roles allow access to the data object; and granting access to the data object based on the determination.

In Example 12, the subject matter of Example 11 includes, retrieving the access privileges of the set of hierarchical data objects and the access privileges of the one or more catalog roles from a role-based security model of the catalog service account.

In Example 13, the subject matter of Example 12 includes, detecting the set of hierarchical data objects comprises a plurality of nested namespaces; and determining the access privileges of the set of hierarchical data objects based on access privileges for each namespace of the plurality of nested namespaces.

In Example 14, the subject matter of Examples 12-13 includes, retrieving a first set of access privileges from the role-based security model, the first set of access privileges associated with the first catalog, and including the access privileges of the one or more catalog roles; retrieving a second set of access privileges from the role-based security model, the second set of access privileges associated with a second catalog of the catalog service account; and configuring access to the first catalog and the second catalog based on the first set of access privileges and the second set of access privileges.

In Example 15, the subject matter of Examples 11-14 includes, retrieving a plurality of principal identities associated with the catalog service account; and selecting a principal identity of the plurality of principal identities based on the identification information of the user.

In Example 16, the subject matter of Example 15 includes, retrieving a plurality of catalog roles configured in the first catalog; and selecting the one or more catalog roles from the plurality of catalog roles based on the principal role.

In Example 17, the subject matter of Examples 11-16 includes, determining the set of hierarchical data objects based on the one or more catalog roles, the set of hierarchical data objects comprising at least one namespace, at least one table, and at least one table view.

In Example 18, the subject matter of Examples 11-17 includes, detecting a synchronization request received at the catalog service account, the synchronization request associated with a second catalog that is external to the catalog service account.

In Example 19, the subject matter of Example 18 includes, generating responsive to the synchronization request, an external catalog representation of the second catalog, the external catalog representation configured as a read-only catalog in the catalog service account.

In Example 20, the subject matter of Example 19 includes, receiving via an application programming interface (API), a notification of an update posted to the second catalog; and updating the external catalog representation based on the update.

Example 21 is a computer-storage medium comprising instructions that, when executed by one or more processors of a machine, configure the machine to perform operations comprising: detecting at a catalog service account, a user request to access a data object, the user request including identification information of the user and a principal role associated with the user; retrieving one or more catalog roles from a first catalog of the catalog service account, the one or more catalog roles corresponding to the principal role; determining a set of hierarchical data objects based on the user request, the set of hierarchical data objects comprising the data object; performing a determination of whether access privileges of the set of hierarchical data objects and access privileges of the one or more catalog roles allow access to the data object; and granting access to the data object based on the determination.

In Example 22, the subject matter of Example 21 includes, the operations further comprising: retrieving the access privileges of the set of hierarchical data objects and the access privileges of the one or more catalog roles from a role-based security model of the catalog service account.

In Example 23, the subject matter of Example 22 includes, the operations further comprising: detecting the set of hierarchical data objects comprises a plurality of nested namespaces; and determining the access privileges of the set of hierarchical data objects based on access privileges for each namespace of the plurality of nested namespaces.

In Example 24, the subject matter of Examples 22-23 includes, the operations further comprising: retrieving a first set of access privileges from the role-based security model, the first set of access privileges associated with the first catalog, and including the access privileges of the one or more catalog roles; retrieving a second set of access privileges from the role-based security model, the second set of access privileges associated with a second catalog of the catalog service account; and configuring access to the first catalog and the second catalog based on the first set of access privileges and the second set of access privileges.

In Example 25, the subject matter of Examples 21-24 includes, the operations further comprising: retrieving a plurality of principal identities associated with the catalog service account; and selecting a principal identity of the plurality of principal identities based on the identification information of the user.

In Example 26, the subject matter of Example 25 includes, the operations further comprising: retrieving a plurality of catalog roles configured in the first catalog; and selecting the one or more catalog roles from the plurality of catalog roles based on the principal role.

In Example 27, the subject matter of Examples 21-26 includes, the operations further comprising: determining the set of hierarchical data objects based on the one or more catalog roles, the set of hierarchical data objects comprising at least one namespace, at least one table, and at least one table view.

In Example 28, the subject matter of Examples 21-27 includes, the operations further comprising: detecting a synchronization request received at the catalog service account, the synchronization request associated with a second catalog that is external to the catalog service account.

In Example 29, the subject matter of Example 28 includes, the operations further comprising: generating responsive to the synchronization request, an external catalog representation of the second catalog, the external catalog representation configured as a read-only catalog in the catalog service account.

In Example 30, the subject matter of Example 29 includes, the operations further comprising: receiving via an application programming interface (API), a notification of an update posted to the second catalog; and updating the external catalog representation based on the update.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments and other embodiments not explicitly described herein will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to perform operations comprising:
detecting, at a catalog service account, a user request to access a data object, the user request including identification information of the user and a principal role associated with the user;
retrieving one or more catalog roles from a first catalog of the catalog service account, the one or more catalog roles corresponding to the principal role;
determining a set of hierarchical data objects based on the user request, the set of hierarchical data objects comprising the data object;
performing a determination of whether access privileges of the set of hierarchical data objects and access privileges of the one or more catalog roles allow access to the data object; and
granting access to the data object based on the determination.

2. The system of claim 1, the operations further comprising:
retrieving the access privileges of the set of hierarchical data objects and the access privileges of the one or more catalog roles from a role-based security model of the catalog service account.

3. The system of claim 2, the operations further comprising:

detecting the set of hierarchical data objects comprises a plurality of nested namespaces; and determining the access privileges of the set of hierarchical data objects based on access privileges for each namespace of the plurality of nested namespaces.

4. The system of claim 2, the operations further comprising:

retrieving a first set of access privileges from the role-based security model, the first set of access privileges associated with the first catalog, and including the access privileges of the one or more catalog roles;

retrieving a second set of access privileges from the role-based security model, the second set of access privileges associated with a second catalog of the catalog service account; and configuring access to the first catalog and the second catalog based on the first set of access privileges and the second set of access privileges.

5. The system of claim 1, the operations further comprising:

retrieving a plurality of principal identities associated with the catalog service account; and selecting a principal identity of the plurality of principal identities based on the identification information of the user.

6. The system of claim 5, the operations further comprising:

retrieving a plurality of catalog roles configured in the first catalog; and selecting the one or more catalog roles from the plurality of catalog roles based on the principal role.

7. The system of claim 1, the operations further comprising:

determining the set of hierarchical data objects based on the one or more catalog roles, the set of hierarchical data objects comprising at least one namespace, at least one table, and at least one table view.

8. The system of claim 1, the operations further comprising:

detecting a synchronization request received at the catalog service account, the synchronization request associated with a second catalog that is external to the catalog service account.

9. The system of claim 8, the operations further comprising:

generating responsive to the synchronization request, an external catalog representation of the second catalog, the external catalog representation configured as a read-only catalog in the catalog service account.

10. The system of claim 9, the operations further comprising:

receiving via an application programming interface (API), a notification of an update posted to the second catalog; and updating the external catalog representation based on the update.

11. A method comprising:

detecting, at a catalog service account, by at least one hardware processor, a user request to access a data object, the user request including identification information of the user and a principal role associated with the user;

retrieving one or more catalog roles from a first catalog of the catalog service account, the one or more catalog roles corresponding to the principal role;

determining a set of hierarchical data objects based on the user request, the set of hierarchical data objects comprising the data object;

performing a determination of whether access privileges of the set of hierarchical data objects and access privileges of the one or more catalog roles allow access to the data object; and granting access to the data object based on the determination.

12. The method of claim 11, further comprising:

retrieving the access privileges of the set of hierarchical data objects and the access privileges of the one or more catalog roles from a role-based security model of the catalog service account.

13. The method of claim 12, further comprising:

detecting the set of hierarchical data objects comprises a plurality of nested namespaces; and determining the access privileges of the set of hierarchical data objects based on access privileges for each namespace of the plurality of nested namespaces.

14. The method of claim 12, further comprising:

retrieving a first set of access privileges from the role-based security model, the first set of access privileges associated with the first catalog, and including the access privileges of the one or more catalog roles;

retrieving a second set of access privileges from the role-based security model, the second set of access privileges associated with a second catalog of the catalog service account; and configuring access to the first catalog and the second catalog based on the first set of access privileges and the second set of access privileges.

15. The method of claim 11, further comprising:

retrieving a plurality of principal identities associated with the catalog service account; and selecting a principal identity of the plurality of principal identities based on the identification information of the user.

16. The method of claim 15, further comprising:

retrieving a plurality of catalog roles configured in the first catalog; and selecting the one or more catalog roles from the plurality of catalog roles based on the principal role.

17. The method of claim 11, further comprising:

determining the set of hierarchical data objects based on the one or more catalog roles, the set of hierarchical data objects comprising at least one namespace, at least one table, and at least one table view.

18. The method of claim 11, further comprising:

detecting a synchronization request received at the catalog service account, the synchronization request associated with a second catalog that is external to the catalog service account.

19. The method of claim 18, further comprising:

generating responsive to the synchronization request, an external catalog representation of the second catalog, the external catalog representation configured as a read-only catalog in the catalog service account.

20. The method of claim 19, further comprising:

receiving via an application programming interface (API), a notification of an update posted to the second catalog; and updating the external catalog representation based on the update.

21. A computer-storage medium comprising instructions that, when executed by one or more processors of a machine, configure the machine to perform operations comprising:

detecting at a catalog service account, a user request to access a data object, the user request including identification information of the user and a principal role associated with the user;

retrieving one or more catalog roles from a first catalog of the catalog service account, the one or more catalog roles corresponding to the principal role;

determining a set of hierarchical data objects based on the user request, the set of hierarchical data objects comprising the data object;

performing a determination of whether access privileges of the set of hierarchical data objects and access privileges of the one or more catalog roles allow access to the data object; and granting access to the data object based on the determination.

22. The computer-storage medium of claim 21, the operations further comprising:

retrieving the access privileges of the set of hierarchical data objects and the access privileges of the one or more catalog roles from a role-based security model of the catalog service account.

23. The computer-storage medium of claim 22, the operations further comprising:

detecting the set of hierarchical data objects comprises a plurality of nested namespaces; and determining the access privileges of the set of hierarchical data objects based on access privileges for each namespace of the plurality of nested namespaces.

24. The computer-storage medium of claim 22, the operations further comprising:

retrieving a first set of access privileges from the role-based security model, the first set of access privileges associated with the first catalog, and including the access privileges of the one or more catalog roles;

retrieving a second set of access privileges from the role-based security model, the second set of access privileges associated with a second catalog of the catalog service account; and configuring access to the first catalog and the second catalog based on the first set of access privileges and the second set of access privileges.

25. The computer-storage medium of claim 21, the operations further comprising:

retrieving a plurality of principal identities associated with the catalog service account; and selecting a principal identity of the plurality of principal identities based on the identification information of the user.

26. The computer-storage medium of claim 25, the operations further comprising:

retrieving a plurality of catalog roles configured in the first catalog; and selecting the one or more catalog roles from the plurality of catalog roles based on the principal role.

27. The computer-storage medium of claim 21, the operations further comprising:

determining the set of hierarchical data objects based on the one or more catalog roles, the set of hierarchical data objects comprising at least one namespace, at least one table, and at least one table view.

28. The computer-storage medium of claim 21, the operations further comprising:

detecting a synchronization request received at the catalog service account, the synchronization request associated with a second catalog that is external to the catalog service account.

29. The computer-storage medium of claim 28, the operations further comprising:

generating responsive to the synchronization request, an external catalog representation of the second catalog, the external catalog representation configured as a read-only catalog in the catalog service account.

30. The computer-storage medium of claim 29, the operations further comprising:

receiving via an application programming interface (API), a notification of an update posted to the second catalog; and updating the external catalog representation based on the update.

* * * * *